(12) United States Patent
Cusanelli

(10) Patent No.: US 6,698,370 B1
(45) Date of Patent: Mar. 2, 2004

(54) HYDRODYNAMIC AND SUPPORTIVE STRUCTURE FOR GATED SHIP STERN

(75) Inventor: Dominic S. Cusanelli, Frederick, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/229,562

(22) Filed: Aug. 29, 2002

(51) Int. Cl.[7] .................................................. B63B 1/32
(52) U.S. Cl. ................. 114/56.1; 114/61.29; 114/67 R; 440/66
(58) Field of Search ........................ 114/56.1, 60, 61.29, 114/70, 284, 285, 286, 287, 126, 67 R; 440/66

(56) References Cited

U.S. PATENT DOCUMENTS

| | | | | |
|---|---|---|---|---|
| 2,406,288 | A | * 8/1946 | Hait | 440/12.64 |
| 3,483,838 | A | * 12/1969 | Rath | 114/60 |
| 3,678,874 | A | * 7/1972 | Flink | 114/285 |
| 4,487,152 | A | 12/1984 | Larson | 114/274 |
| 4,896,622 | A | 1/1990 | Thomas | 114/285 |
| 4,961,396 | A | 10/1990 | Sasagawa | 114/285 |
| 5,279,247 | A | 1/1994 | Plangetis | 114/339 |
| 5,425,325 | A | 6/1995 | Washio | 114/290 |
| 5,628,272 | A | 5/1997 | Thomas | 114/285 |
| 6,038,995 | A | 3/2000 | Karafiath et al. | 114/271 |

FOREIGN PATENT DOCUMENTS

JP     2002-68072    * 3/2002

OTHER PUBLICATIONS

Mary Zoccola, "The Use of Stern Flap Technology Spreads to Other Ships," *Wavelengths: An Employee's Digest of Events and Issues*, Sep. 2001; Internet version (5 pages) obtained from NSWCCD (Naval Surface Warfare Center, Carderock Division) website at http://www.dt.navy.mil/pao/excerpts%20pages/2001/sternFlap9_01.html.

Dominic S. Cusanelli and Gabor Karafiath, "Advances in Stern Flap Design and Application," FAST 2001 (The Sixth International Conference on Fast Sea Transportation), Southampton, U.K., Sep. 4–6, 2001 (14 pages).

Dominic S. Cusanelli, "Stern Flap Powering Performance on the PC–1 Class PATROL Coastal, Full Scale Trials and Model Experiments," Patrol '96 Conference, New Orleans, Louisiana, Dec. 5–7, 1996 (13 pages).

Dominic S. Cusanelli and Kenneth M. Forgach, "Stern Flaps for Enhanced Powering Performance," Twenty–Fourth American Towing Tank Conference, College Station, Texas, Nov. 2–3, 1995 (12 pages).

* cited by examiner

Primary Examiner—Sherman Basinger
(74) Attorney, Agent, or Firm—Howard Kaiser

(57) ABSTRACT

A dualistic stern-appendant device comprises, in integrated form, at least two gate-supportive bodies and at least one flap-hydrodynamic body. The device is characterized by an alternating arrangement of bodies (totaling an odd number of at least three bodies) whereby no two consecutive gate-supportive bodies are next to each other and no two consecutive flap-hydrodynamic bodies are next to each other. Each gate-supportive body has an upper surface which is a gate-supportive surface, all of the gate-support surfaces together representing a cumulative gate-supportive surface. Each flap-hydrodynamic body has a lower surface which is a flap-hydrodynamic surface, all of the flap-hydrodynamic surfaces together representing a cumulative flap-hydrodynamic surface. The geometric plane defined by the cumulative gate-support surface is not encroached upon by any flap-hydrodynamic body. The ship's bottom hull surface and the cumulative flap-hydrodynamic surface together represent an extended, continuous bottom hull surface having associated hydrodynamic benefits (e.g., improved ship's powering).

20 Claims, 26 Drawing Sheets

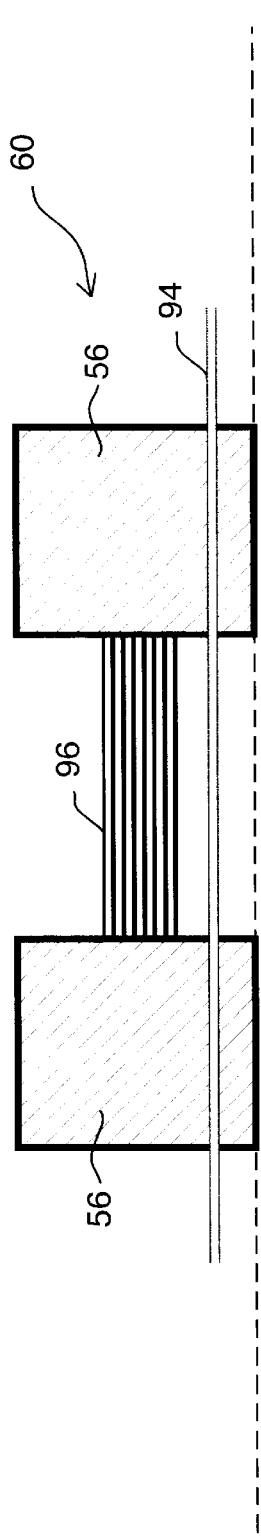
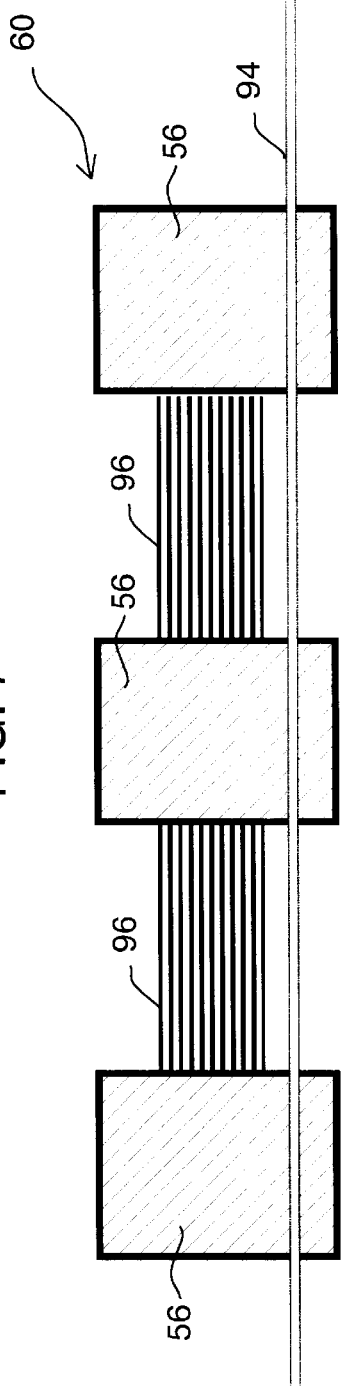
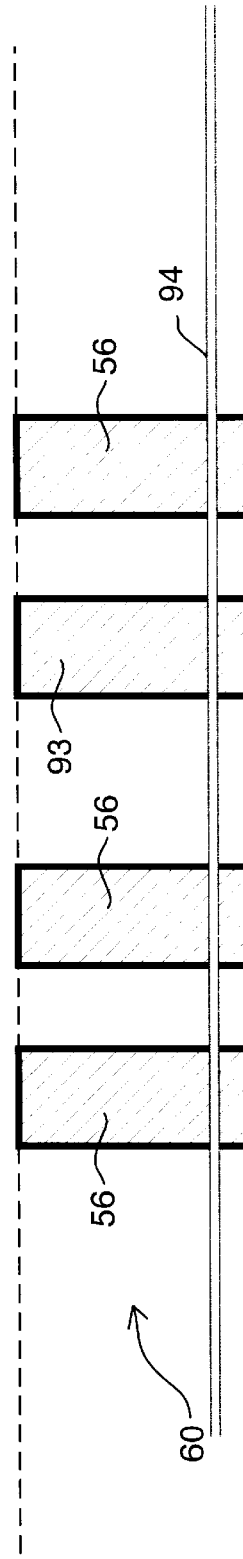

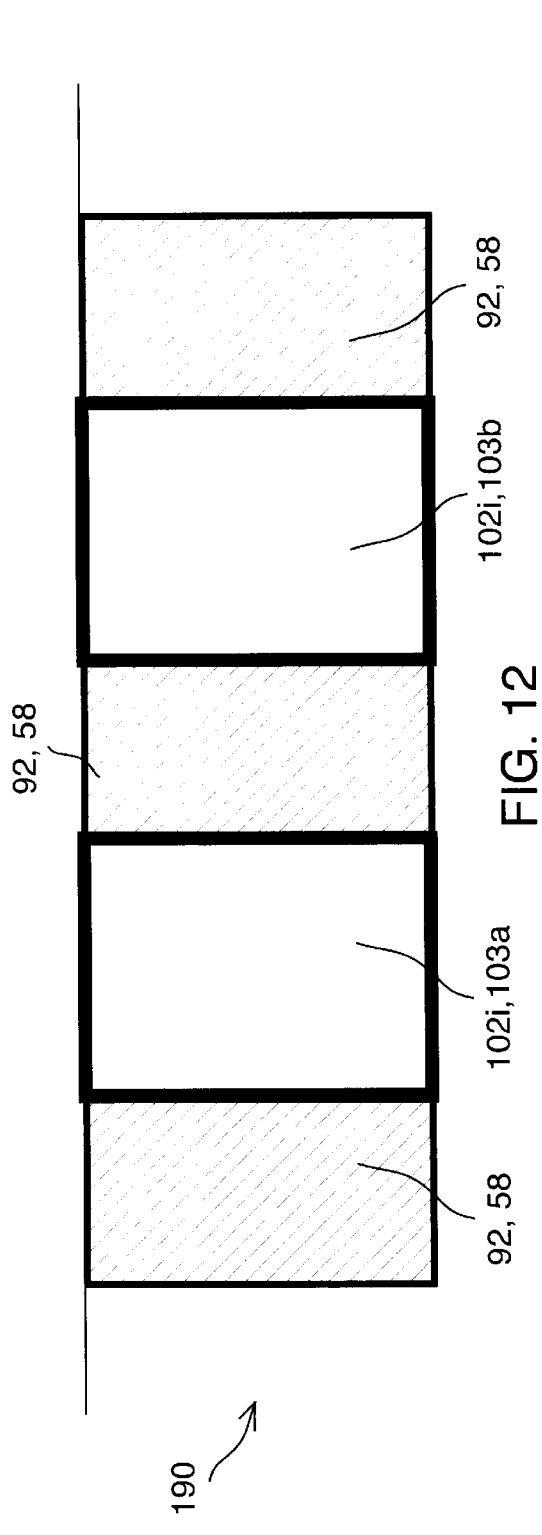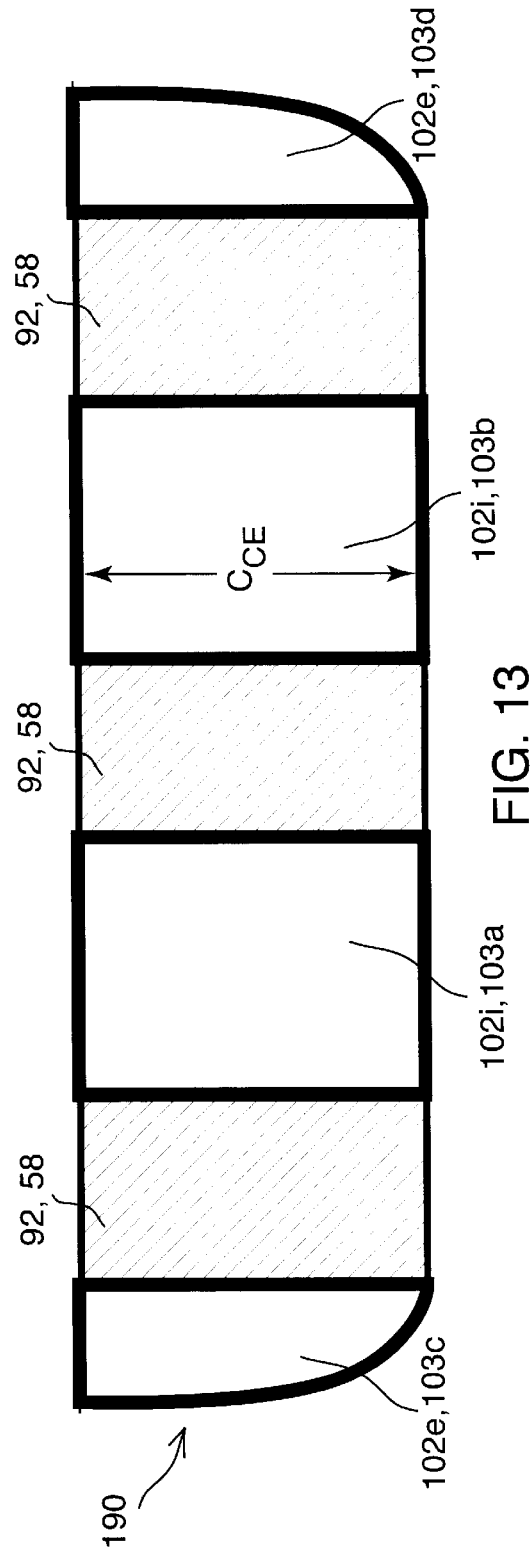

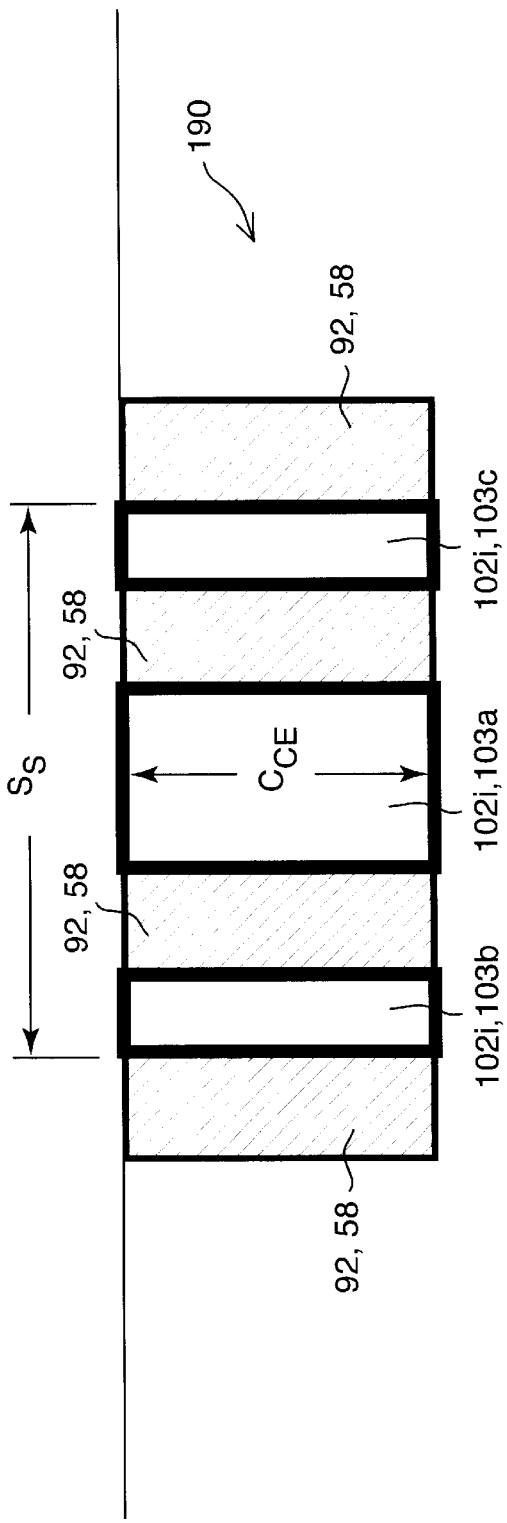
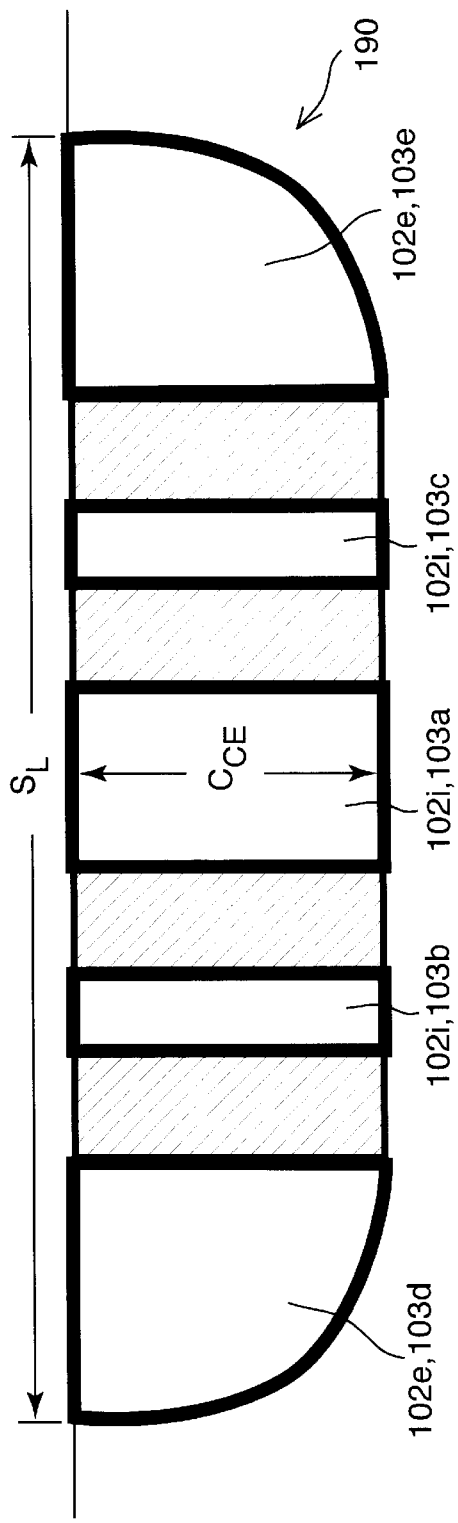
FIG. 14
FIG. 15

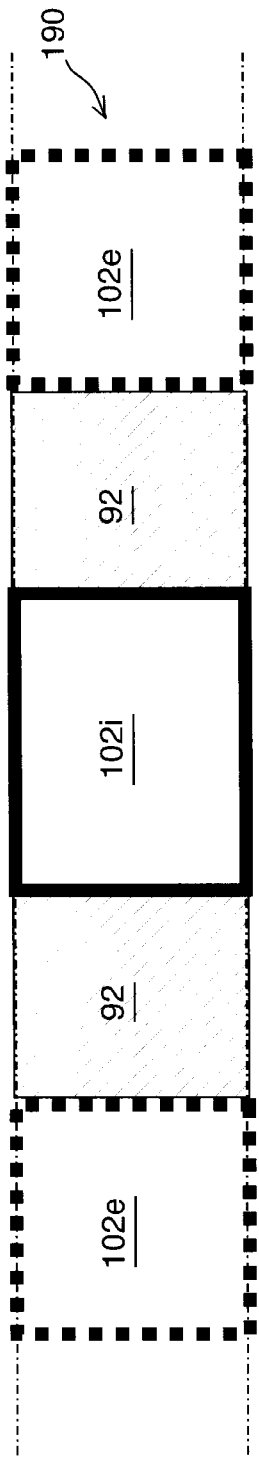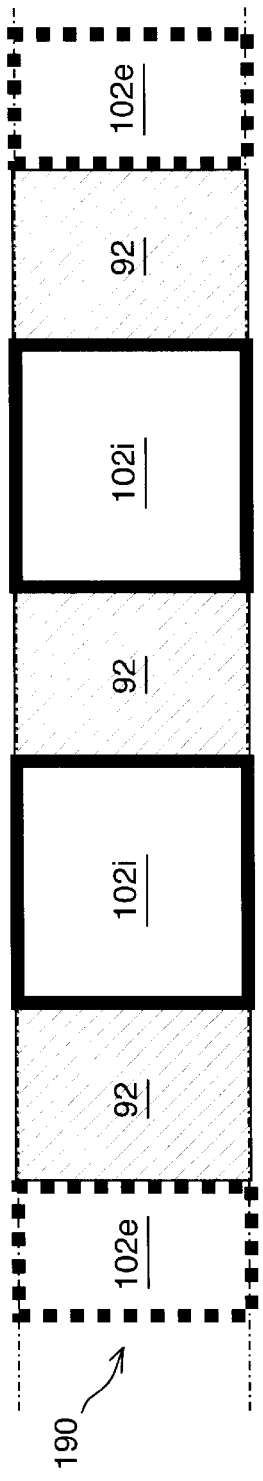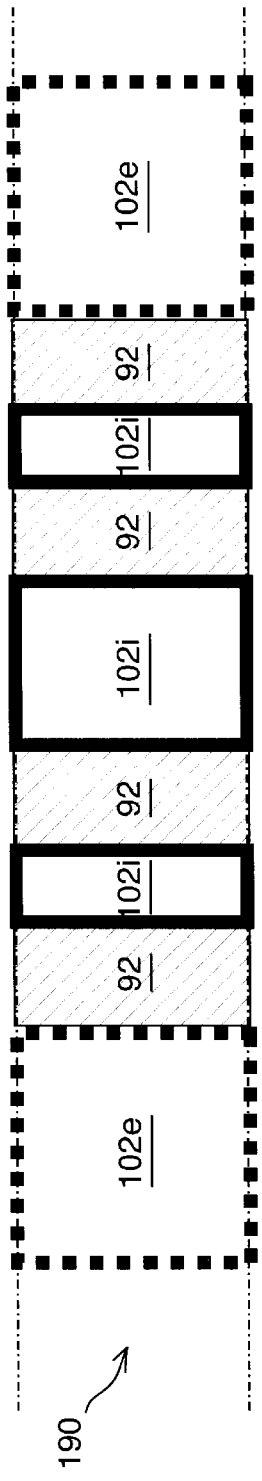

HYDRODYNAMIC AND SUPPORTIVE STRUCTURE FOR GATED SHIP STERN

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to the hydrodynamics of marine vessels, more particularly to adjuncts, appendages and auxiliary devices for affecting same.

A stern flap is an extension of the hull bottom surface which extends aft of the transom. It is a relatively small appendage (typically constructed so as to include internal metal bracing beams and external metal plate material) which is fitted to the ship's transom. Critical stern flap geometry parameters include: (i) chord length; (ii) span across the transom; and, (iii) an angle denoted as "trailing edge down" (TED), referenced to the local buttock slope (run) at the transom. The main purpose of a stern flap device is to reduce the shaft power required to propel a ship through the water, thereby reducing the engine's fuel consumption and increasing the ship's top speed and range. The hydrodynamically significant stern flap surface is its lower surface. In principle, a stern flap is coupled with a hull stern so that the hull bottom surface and the stern flap lower surface essentially represent a kind of surface continuum, thereby effectively altering the hydrodynamic character of the hull.

The application of stern flaps to large displacement vessels is a fairly recent innovation. The U.S. Navy has been investigating the use of stern flaps on many different hull types. The standard (traditional or conventional) stern flap is designed with parallel, linear (straight) leading and trailing edges for orientation of these linear edges perpendicular to the ship centerline. Stern flaps have now been proven by the U.S. Navy to reduce the requisite amount of propulsive power during navigation, with several concomitant advantages. Stern flaps: foster reductions in operating and life-cycle costs through fuel savings; increase both ship speed and range; decrease the amount of pollutants released by ships into the atmosphere; and, reduce propeller loading, cavitation, vibration and noise tendencies.

Incorporated herein by reference is the following United States patent which is pertinent to stern flaps: Karafiath et al. U.S. Pat. No. 6,038,995 issued Mar. 21, 2000, entitled "Combined Wedge-Flap for Improved Ship Powering." The following papers, each of which is incorporated herein by reference, are also pertinent to stern flaps: Karafiath, G., D. S. Cusanelli, and C. W. Lin, "Stern Wedges and Stern Flaps for Improved Powering —U.S. Navy Experience," 1999 SNAME Annual Meeting (paper), Baltimore, Md. (September 1999); Cusanelli, D. S., "Stern Flaps—A Chronicle of Success at Sea (1989–2002)," SNAME Innovations in Marine Transportation, Pacific Grove, Calif. (May 2002); Cave, W. L., and D. S. Cusanelli, "Effect of Stern Flaps on Powering Performance of the FFG-7 Class," SNAME Chesapeake Sect Paper, (October 1989); Cusanelli, D. S., and W. L. Cave, "Effect of Stern Flaps on Powering Performance of the FFG-7 Class," Marine Technology, Vol. 30, No. 1, pp 39–50, (January 1993); Cusanelli, D. S., and K. M. Forgach, "Stern Flaps for Enhanced Powering Performance," Proceedings of 24th ATTC, College Station, Tex. (November 1995); Cusanelli, D. S., "Stern Flap Powering Performance on the PC 1 Class Patrol Coastal, Full Scale Trials and Model Experiments," PATROL '96 Conference Proceedings, New Orleans, La., (December 1996); Cusanelli, D. S., "Integrated Wedge-Flap, an Energy Saving Device," 21st UJNR Marine Facilities Panel Meeting, Tokyo, Japan (May 1997); Cusanelli, D. S., and G. Karafiath, "Integrated Wedge-Flap for Enhanced Powering Performance," FAST '97, Fourth International Conference on Fast Sea Transportation, Sydney, Australia, (July 1997); Cusanelli, D. S., "Stern Flap Installations on Three U.S. Navy Ships," ASNE 1998 Symposium—21st Century Combatant Technology, Biloxi, Miss. (January 1998); Cusanelli, D. S. and L. Hundley, "Stern Flap Powering Performance on a SPRUANCE Class Destroyer, Full Scale Trials and Model Experiments," Research to Reality in Ship Systems Engineering Symposium, Tysons Corner, Va. (September 1998); Cusanelli, D. S. and L. Hundley, "Stern Flap Powering Performance on a SPRUANCE Class Destroyer, Full Scale Trials and Model Experiments," Naval Engineers Journal, Vol. 111, No. 2 (March 1999); Cusanelli, D. S., S. D. Jessup and S. Gowing, "Exploring Hydrodynamic Enhancements to the USS Arleigh Burke (DDG 51)," FAST '99, Fifth International Conference on Fast Sea Transportation, Seattle, Wash. (August 1999); Cusanelli, D. S., and G. Karafiath, "Energy Savings and Environmental Benefits of Stern Flaps on Navy Ships," ASNE Symposium: Marine Environmental Stewardship for the 21st Century, Arlington, Va. (October 1999); Cusanelli, D. S., and G. Karafiath, "Stern Flaps on Navy Ships, Fuel Savings and Environmental Benefits," IMT'99, Innovations in Marine Technology, New Orleans, La. (December 1999); Cusanelli, D. S., "Stern Flaps and Bow Bulbs for Existing Vessels—Reducing Shipboard Fuel Consumption and Emissions," United Nations Environmental Programme (UNEP 2001), Brussels, Belgium (February 2001); Cusanelli, D. S., and G. Karafiath, "Stern Flaps", Professional Boat Builder Magazine, pages 81–87, (April/May 2001); Karafiath, G, D. S. Cusanelli, S. D. Jessup and C. D. Barry, "Hydrodynamic Efficiency Improvements to the USCG 110 Ft. WPB Island Class Patrol Boats," 2001 SNAME Annual Meeting Paper, Orlando, Fla. (October 2001).

"Amphibious" U.S. Navy assault ships, designated "L__" ships (e.g., LHA, LSD, LHD, etc.), are primary landing ships that resemble small aircraft carriers. These amphibious ships contain massive well decks (which are accessed through one or more large folding stern gates), and are designed for putting troops on hostile shores. The present inventor was tasked to apply existing stern flap technology to "amphibious" U.S. Navy ships of the "L__" classes such as the WASP (LHD 1) Class, the WHIDBEY ISLAND (LSD 41) Class, or the HARPER'S FERRY (LSD 49) Class, wherein the hull design includes a large stern gate along with stern gate support structure (including plural support brackets) at least partially submerged aft of the transom.

The stern gate of an LHD class amphibious assault ship is typically designed to be mechanically pivotable about an axis situated in the lower part of the stern and above the waterline, thereby "opening" rotatingly downward-aftward and "closing" rotatingly upward-forward. A sizable structural unit is attached to the ship transom to support the stern gate in its fully opened position. This stern gate support structure generally includes main support brackets, smaller bracing supports, and a large diameter protection pipe defining its perimeter. When fully closed, the stern gate is positioned in an approximately vertical position; when fully open, the stern gate is positioned in an approximately horizontal or slightly downward from horizontal position so that the lower surface of the stern gate suitably rests upon the upper surfaces of the support brackets.

Prior to the present invention, U.S. Navy investigators believed that the presence of the stern gate support structure precluded the design of shallower angled stern flaps. However, the Navy investigators perceived as a benefit a "masking" effect associated with installation of a stern flap beneath the stern gate support structure. "Masking" of the stern gate support structure involved the effect of deflecting fluid flow away from the potentially high resistance components of the stern gate support structure. It was previously thought by U.S. Navy investigators that this kind of flap-underneath configuration would maximize the reduction of possible ship resistance (drag), due to the masking of the submerged stern gate support structure. Nevertheless, it eventually became apparent to U.S. Navy investigators that this masking effect (i.e., the effect of masking the drag of the stern gate support structure) did not compensate for the poor performance due to the excessive flap angle produced by installation beneath the gate supports.

The U.S. Navy conducted tests wherein several standard stern flap designs were affixed to the lower surfaces of the existing stern gate support brackets. The flaps were thereby limited to high TED angles. Although the best of these standard flap designs reduced high speed powering, the excessive TED angle produced harsh penalties at low speeds. Without exception, the installation of a standard stern flap beneath the stern gate support structure forced the flap angle (TED) to be unrealistically high, and low-speed performance was correspondingly poor. For instance, the U.S. Navy tested several standard stern flap designs on the WASP (LHD 1) class, wherein these flaps were affixed to the lower surface of the stern gate supports, thus limiting the flap to rather high TED angles of twenty degrees (20°) and above. The best among these initial standard flap designs reduced power by 6% at 24 knots, but the excessive TED angle produced unfavorable low speed penalties. On the TARAWA (LHA 1) class, a flap of standard design was reduced to a five degree TED angle, and produced much improved low speed performance, with a 2% powering reduction at 24 knots. However, stern flap design criteria for the TARAWA Class were less stringent than for the WASP Class because of certain hydrodynamic and architectural differences. In particular, the TARAWA included sectional split-gate doors not requiring submerged support structure. In contrast, the WASP folding gate, designed to service an enlarged well-deck, included submerged support structure. It is reasonable to expect that shallower TED angles than 20° on marine vessels such as the WASP will result in greater powering reductions due to improved low speed performance than those exhibited at TED angles of 20° and deeper.

The inventor was thus motivated by his recognition that the standard stern flap would be limitedly advantageous for the task of applying existing stern flap technology to amphibious U.S. Navy ships such as the WASP (LHD 1) Class, the WHIDBEY ISLAND (LSD 41) Class, or the HARPER'S FERRY (LSD 49) Class. A configuration involving a standard stern flap and a gated transom, wherein the standard stern flap is disposed below the transom's gating construction in order to avoid or circumvent it, limits the theoretical potentiality of hydrodynamic benefits which could be associated with stern flap implementation. If the premise of stern flap design in amphibious ship applications is that the stern flap be designed around the existing stern gate support structure (which is partially submerged aft of the transom), then stern flap design flexibility is significantly limited. According to this circumventive design premise, installation of a standard stern flap on a gated transom having at least partially submerged bracketing structure(s) associated therewith will necessitate placement of the upper stern flap surface beneath the lower surface(s) of the stern gate's bracketing member(s). This circumventive design approach will inevitably result in a relatively large TED angle of the stern flap—a design that will usually be less advantageous than if the stern flap were positioned at a relatively small TED angle. Furthermore, there are structural issues associated with such circumventive design approach. It may be problematical to complete the structural assembly so as to ensure the continued integrity of the stern gate support structure. Another limiting consideration is that the stern flap must be continually placed beneath the lower surface of the stern gate while the stern gate is in its open position; if the stern flap projects too far aft, for instance, it will impede the complete opening of the stern gate.

SUMMARY OF THE INVENTION

In view of the foregoing, it is an object of the present invention to provide an improved stern flap methodology for application to a marine vessel having an essentially flat stern which is "gated" so as to have associated therewith submerged or partially submerged support structure (such as that which includes bracketing members) projecting aft of the stern, wherein such support structure is designed to be supportive of the openly positioned stern gate.

Prior to the present invention, the prevailing wisdom in the U.S. Navy was that the presence of an amphibious ship's stern gate support structure precluded the design of shallower angled stern flaps. Previous applications of traditional stern flaps to amphibious hulls prescribed installation beneath the stern gate support structure. The present invention more fully avails itself of the potential benefits of stern flap technology. In particular, the present invention advantageously provides for the design of stern flaps characterized by the shallower angles which are necessary for the desired performance enhancement at the low to moderate ship speeds frequently navigated by these amphibious ships.

According to typical embodiments, the present invention provides an integratedly hydrodynamic and supportive structure for a gated ship stern. Application of the present invention will usually be with respect to "amphibious ships" and other vessels having stern gates and associated stern gate support structure including plural structural components. The present invention is applicable to any hull design which includes stern gate means (e.g., including a large stern gate such as exemplified by a WASP class ship) and stern gate support means (e.g., a stern gate support structural unit including plural bracketing members) at least partially submerged aft of the transom. This genre of hull design is exemplified by some U.S. Navy amphibious ships such as those mentioned herein.

The present invention represents a unique methodology involving the adaptation of stern flap structure to an amphibious vehicle's gated transom characterized by supportive structure upon which a gate rests when in a fully open position. The inventor, a naval architect employed by the U.S. Navy, conceived his invention based on his realization that the application of stern flap technology to the gated transom of the Navy ships of interest (such as the WASP Class, WHIDBEY ISLAND Class or HARPER'S FERRY Class) would necessitate a new stern flap design and arrangement. The inventor initially investigated his amphibious ship stern flap concept by conducting model-scale tests on such a hullform characterized by a gated transom. The inventor thus demonstrated that the performance of a traditional flap design, when applied to this kind of hullform, was inferior to that of his new stern flap configuration.

According to many embodiments of the present invention, dual-purpose adjunctive apparatus is for being appended to the stern of a marine hull having a stern gate. The inventive apparatus comprises plural spaced bracket members and at least one stern flap member each interposedly joining two bracket members. Each bracket member has a bracket member top surface. Each stern flap member has a stern flap member bottom surface. The inventive apparatus is capable of being appended to the stern whereby the stern gate rests upon the at least two bracket member top surfaces and whereby the at least one stern flap member bottom surface interacts with the water navigated by the marine vessel, the inventive apparatus thereby being structurally supportive with respect to the stern gate and hydrodynamically influential with respect to the marine vessel.

Typical embodiments of the present invention provide an auxilliary assembly for attachment at the stern of a ship. The stern includes a stern gate pivotable about a horizontal axis between closed and open positions of the stern gate. The inventive assembly is adaptable to attachment at least substantially below the axis so as to be generally disposed projectingly aft of the stern. The assembly comprises at least three united components consisting of at least two support components and at least one hydrodynamic component. During the attachment of the inventive assembly: (a) the at least two support components and the at least one hydrodynamic component are in alternating arrangement across the stern; (b) the at least two support components generally describe a unitary support surface for supporting the stern gate when the stern gate is in an open position; and, (c) the at least one hydrodynamic component generally describes a unitary hydrodynamic surface for hydrodynamically affecting the ship when the ship is navigating.

According to some embodiments, the present invention is a method of improving the hydrodynamic quality of a vessel. The vessel includes a stern provided with a stern gate. The stern has a stern gate support device annexed thereto. The stern gate support device includes a plurality of separate approximately parallel support members, each support member protruding approximately longitudinally relative to the vessel. The method comprises integrating at least one stern flap section with the support members. The integrating includes connecting every pair of adjacent support members via a different stern flap section, the integrating thereby forming an integral unit annexed to the stern. The integral unit is characterized by supportive functionality associated with the support members and by hydrodynamic functionality associated with the at least one stern flap section. Typical of inventive method embodiments, each support member is attached to the stern. The stern gate support device further includes at least one reinforcement member, each reinforcement member being attached to at least two support members and being unattached to the stern. The inventive method further comprises removing the at least one reinforcement member prior to performing the integrating.

The present invention affords several advantages when used in association with marine vessels having a stern characterized by a gating construction. According to the present invention, the overall stern flap structure (including its lower surface, which is the hydrodynamic surface) is integrated through the stern gate support brackets, rather than installed under the brackets as in previous design attempts. The present invention allows for the hydrodynamic surface (the lower flap surface) to be installed at the shallower angles necessary for the desired performance enhancement.

Furthermore, the full-scale design of the present invention's stern flap will permit removal of certain structural components of the original stern gate support structure. The inventive stern flap will include internal structure and topside closing plates, which will facilitate integration within the existing stern gate support structure. Since according to this invention stern flap structure is to be situated between the stern gate support brackets, this allows for elimination of structural components such as the large diameter protection pipe and the smaller bracing supports. The elimination of these components further reduces hull resistance (drag).

Moreover, according to some embodiments the present invention's amphibious ship stern flap can be designed with reduced span, so that the entirety of the inventive stern flap's structure remains within the area already proscribed by the main stern gate support brackets. This design will obviate all components of the stern flap outboard of the main stern gate support brackets, thus further easing ship integration.

The inventor alludes to his invention in the paper Dominic S. Cusanelli and Gabor Karafiath, "Advances in Stern Flap Design and Application," FAST 2001 (The Sixth International Conference on Fast Sea Transportation), Southhampton, United Kingdom, Sep. 4–6, 2001, incorporated herein by reference.

The present invention bears some relation to the invention disclosed by Dominic S. Cusanelli in his U.S. nonprovisional patent application filed on Aug. 14, 2002 entitled "Contour Stern Flap," incorporated herein by reference.

Other objects, advantages and features of this invention will become apparent from the following detailed description of the invention when considered in conjunction with the accompanying drawings.

BRIEF DESCRIPTION OF THE DRAWINGS

In order that the present invention may be clearly understood, it will now be described, by way of example, with reference to the accompanying drawings, wherein like numbers indicate the same or similar components, and wherein:

FIG. 7, FIG. 8 and FIG. 9 are similar diagrammatic ship's rear elevation views of the double-bracketed, triple-bracketed and quadruple-bracketed conventional stern gate support structures shown, respectively, in FIG. 4, FIG. 5 and FIG. 6.

FIG. 12, FIG. 13, FIG. 14, FIG. 15, FIG. 16 and FIG. 17 are similar diagrammatic bottom plan views, similar to the view specifically of the integral flap/support structure shown in FIG. 11, of various inventive embodiments of integral flap/support structures. The integral flap/support structures shown in FIG. 12 and FIG. 13 each include three support brackets. The integral flap/support structures shown in FIG. 14 through FIG. 17 each include four support brackets.

FIG 18, FIG. 19, FIG. 20, FIG. 21, FIG. 22, FIG. 23, FIG. 24, FIG. 25, FIG. 26, FIG 27 and FIG. 28 are similar diagrammatic ship's rear elevation views, similar to the views of the conventional stern gate support structures shown in FIG. 4 through FIG. 6, of various inventive embodiments of integral flap/support structures. The integral flap/support structure shown in FIG. 18 includes two support brackets. The integral flap/support structure shown in FIG. 19 includes three support brackets. The integral flap/support structures shown in FIG. 20 through FIG. 28 each include four support brackets.

Figure 32:
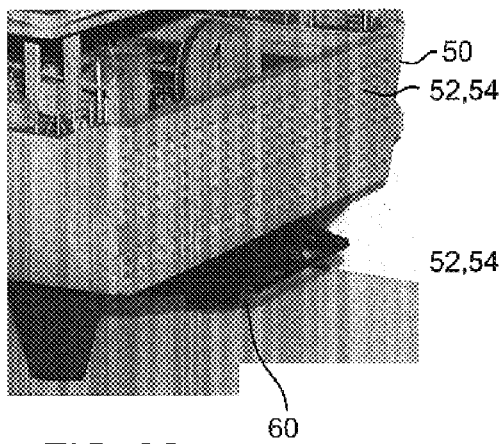
FIG. 32 and FIG. 33 are photographic representations, in two different upper back perspective views, of a display model of a U.S. Navy amphibious ship of the HARPER'S FERRY Class, depicting a typical arrangement of the stern gate as was well as the stern gate support structure.
Figure 33:
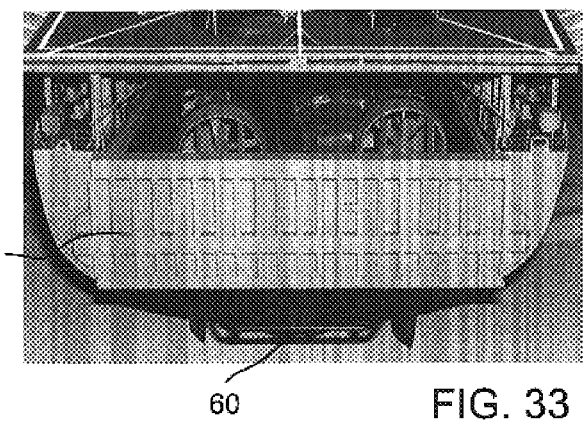
Figure 34:
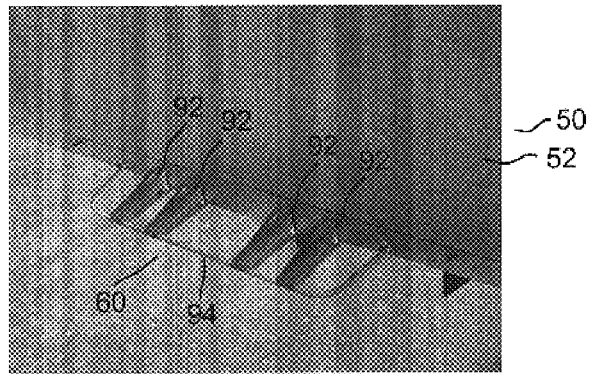
FIG. 34 is a photographic representation, in an upper back perspective view, of the 1:31.069 scale ship hydrodynamic test model of a U.S. Navy amphibious ship of the WASP Class which was used for U.S. Navy testing of the present invention depicting the "baseline" stern gate support structure.
Figure 38:
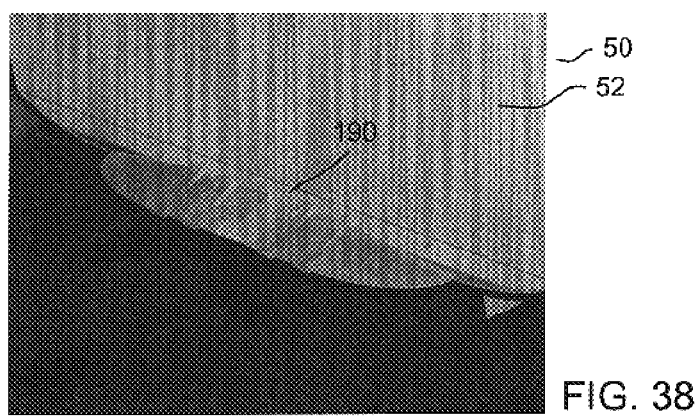
FIG. 38 is a photographic representation, in an upper back perspective view, of an inventive embodiment of an integral flap/support structure (similar to that shown in FIG. 15), shown installed with respect to the ship model shown in FIG. 34, such inventive embodiment having a span which exceeds the distance between the lateral extremes of the existing stern gate support bracketing structure, and having a chord length which is equal to the chord length of the existing stern gate support bracketing structure.
Figure 39:
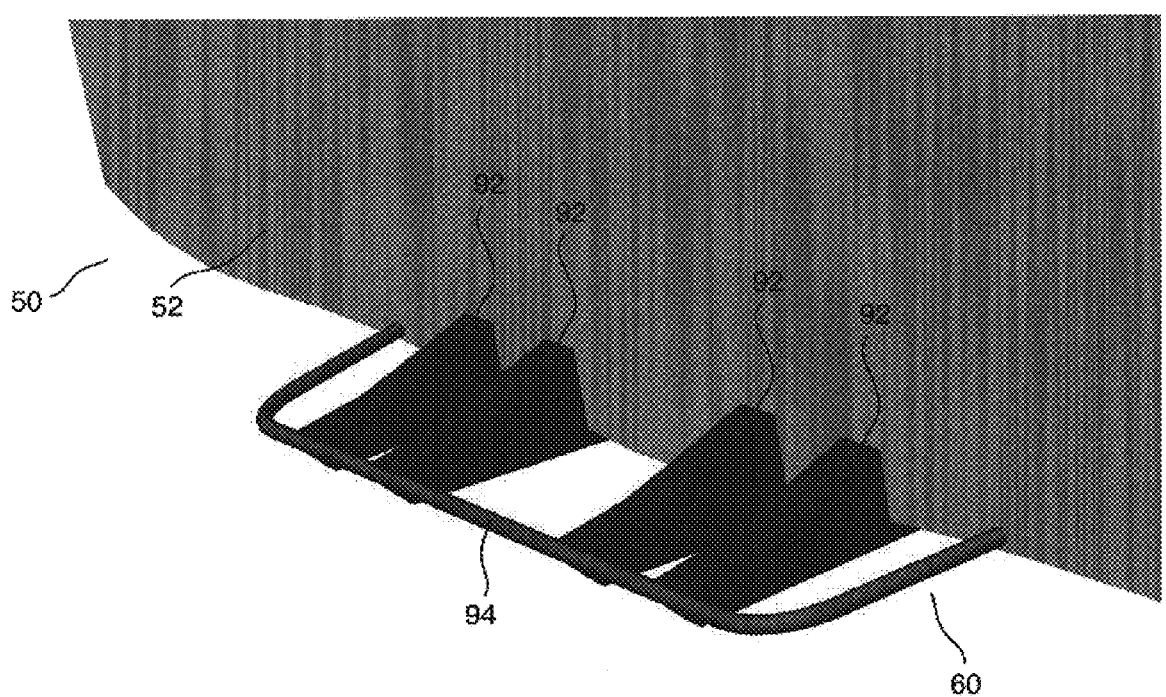
FIG. 39 is a perspective-view Computer Aided Design (CAD) rendering of the WASP Class amphibious ship and concomitant conventional stern gate support structure which are shown in FIG. 34.
Figure 46:
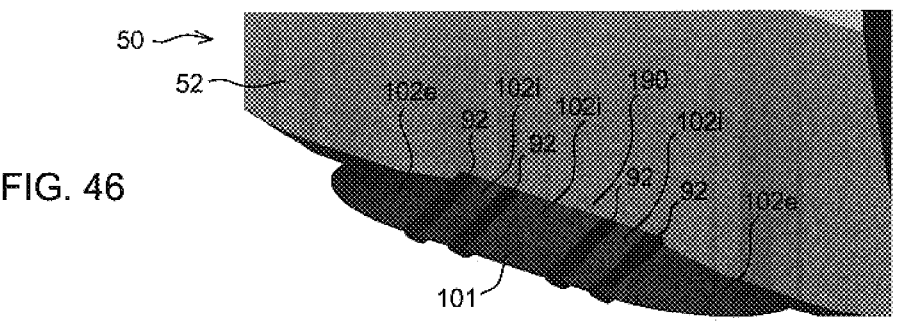
Figure 47:
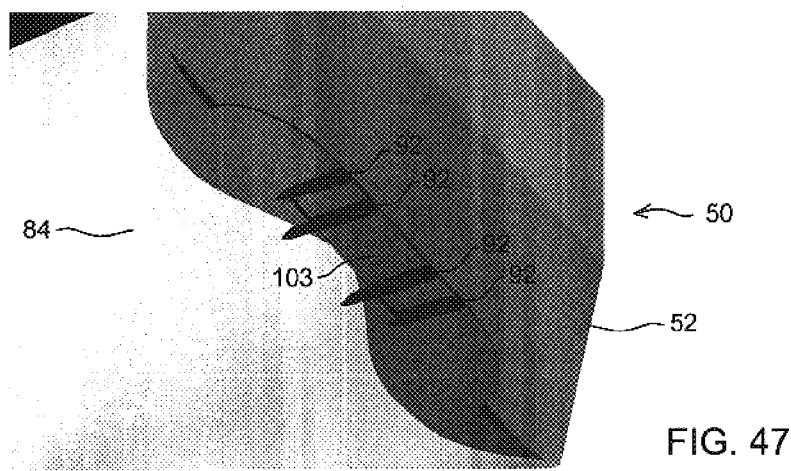
Figure 48:
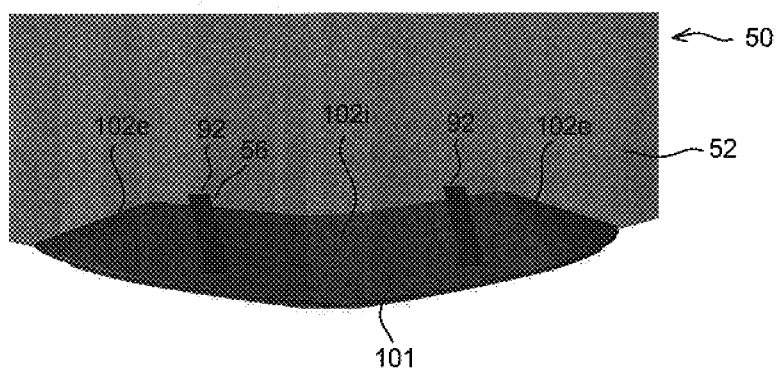
Figure 49:
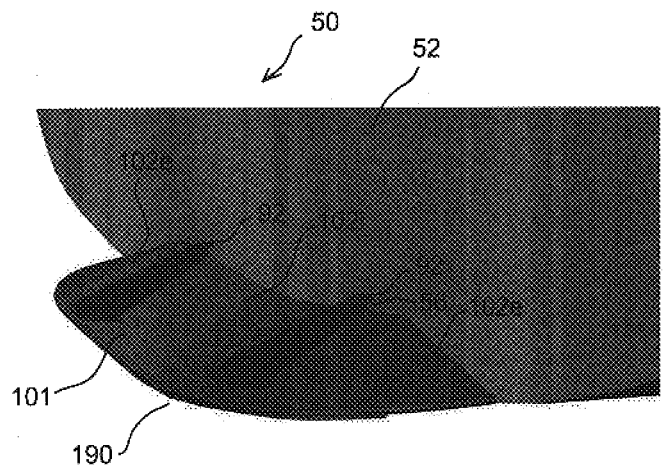

The integral flap/support structure shown computer-generatively in FIG. 46 (upper perspective view) and FIG. 47 (lower perspective view) corresponds to that shown photographically in FIG. 38. Shown in FIG. 48 and FIG. 49 are two different views of the same inventive integral flap/support structure which includes the two support brackets arrangement as on the HARPER'S FERRY class shown photographically FIG. 32 and FIG. 33.

DETAILED DESCRIPTION OF THE INVENTION

Figure 1:
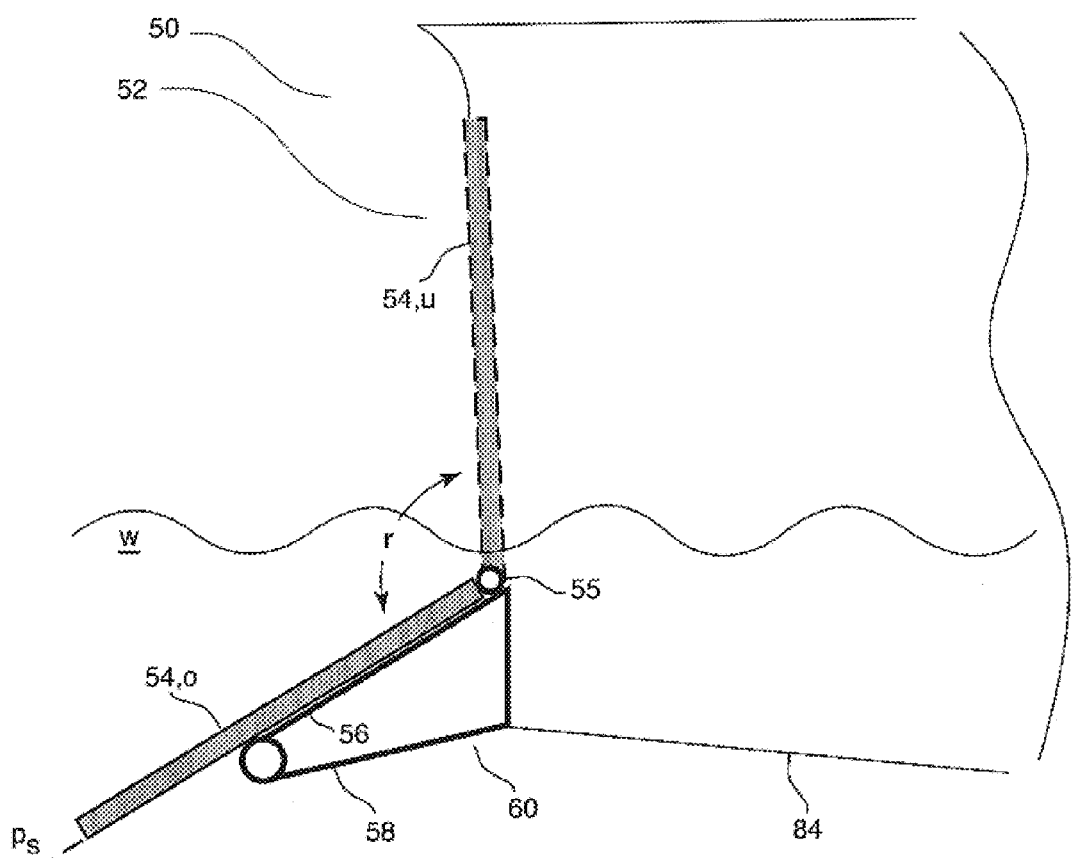
FIG. 1 is a diagrammatic partial side elevation view of a representative amphibious ship's hull, particularly illustrating operation of the stern gate and the concomitant stern gate support structure.

Referring now to FIG. 1, amphibious ship 50 has an essentially flat stern 52 provided with a stern gate 54 which is pivotable about horizontal axis 55. Stern gate 54 swings pivotably outward-aftward-downward and inward-forward-upward as indicated by bidirectional arrow r. Gate 54 is shown both in the fully closed position (indicated by gate position u) and the fully open position (indicated by gate position o). When in open position o, stern gate 54 is at least partially submerged in water w and rests upon the collective upper, "supportive" support surface 56 of stern gate support structure 60, which also includes a collective lower, "non-supportive" support surface 58. The opening of gate 54 permits entrance through the gate opening into the interior of ship 50 (e.g., into a well deck); under various circumstances, gate 54 can serve as a ramp, or as a facilitator for partially flooding the well deck.

Figure 2:
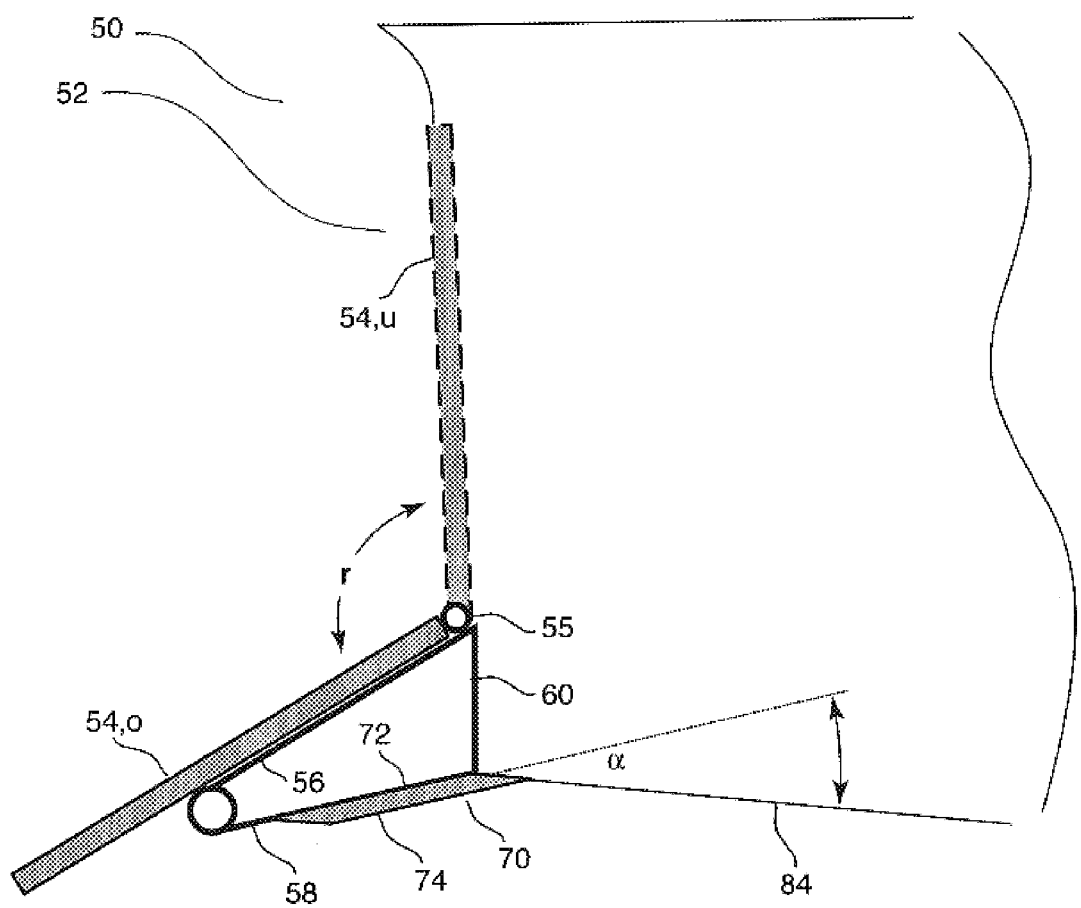
FIG. 2 is a view similar to the view shown in FIG. 1, illustrating the prior conception of a "circumventive" approach to providing the amphibious ship's hull with a stern flap, wherein a stern flap is attached at the underside of the stern gate support structure.

With reference to FIG. 2, previous to the present invention, the U.S. Navy conceived of stern flap installation on amphibious ship 50 as necessarily involving an arrangement whereby a standard stern flap 70 is attached to conventional stern gate support structure 60 at its lower support surface 58. Standard stern flap 70 includes standard upper flap surface 72 (which is affixed to lower support surface 58) and standard lower flap surface 74 (which represents the hydrodynamic flap surface). Based on testing the U.S. Navy evaluated such designs as affording some benefit, albeit sacrificing performance at lower speeds because of the deep TED angles α (which were as high as 20°) of standard stern flap 70.

Figure 3:
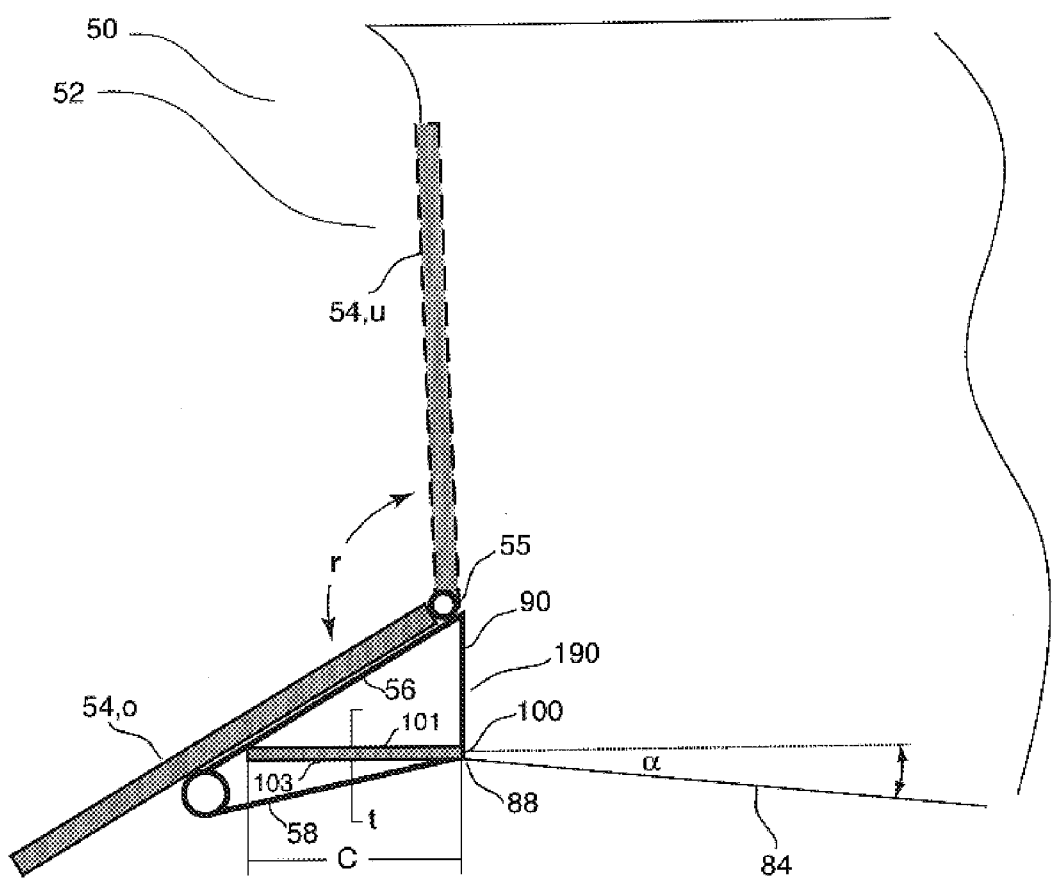
FIG. 3 is a view similar to the view shown in FIG. 1, illustrating the present invention's "integrative" approach to providing the amphibious ship's hull with a stern flap, wherein a stern flap is integrated with existing stern gate support structure.
Figure 4:
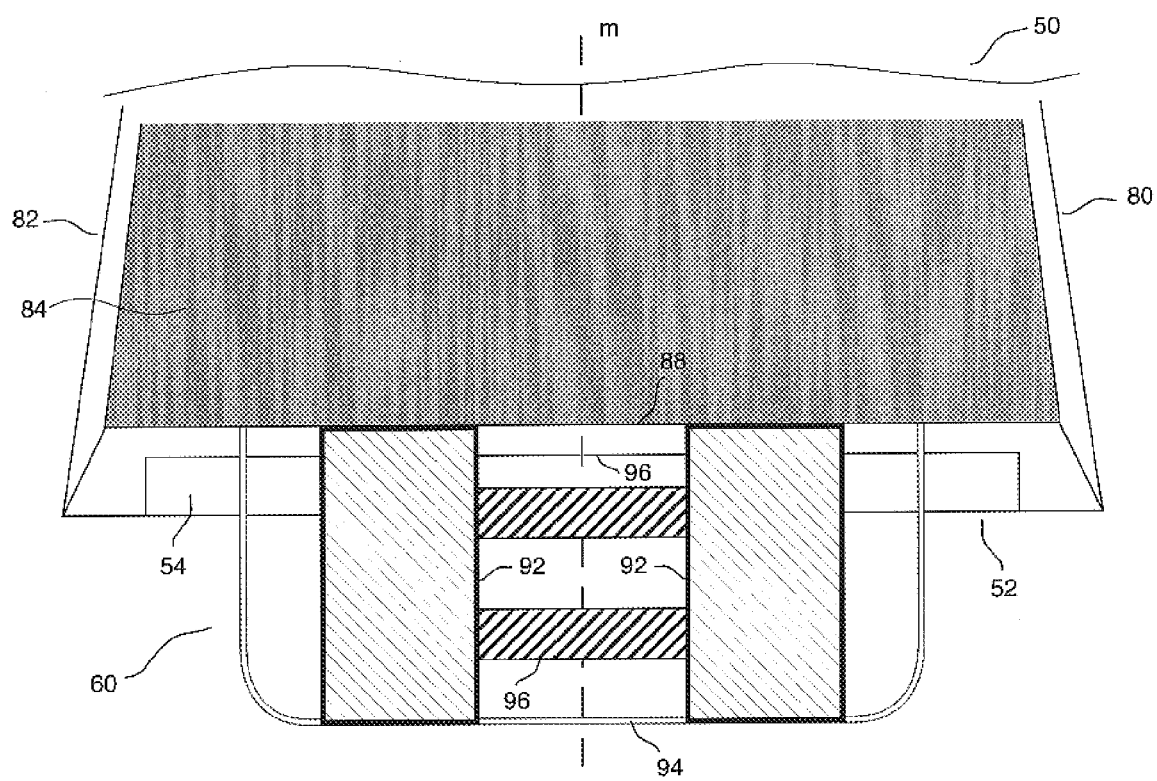
FIG. 4, FIG. 5 and FIG. 6 are similar diagrammatic bottom plan views of a representative amphibious ship's hull (such as shown in FIG. 1), particularly illustrating, respectively, "double-bracketed" (FIG. 4), "triple-bracketed" (FIG. 5) and "quadruple-bracketed" (FIG. 6) conventional stern gate support structures.
Figure 5:
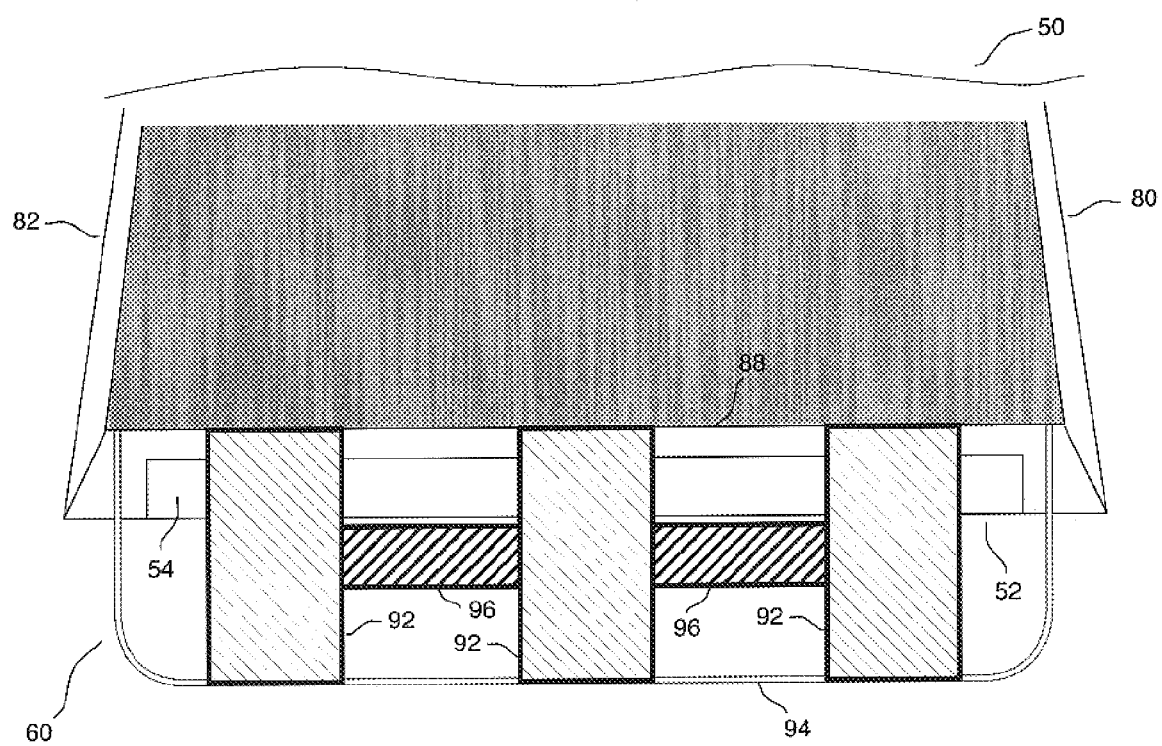
Figure 6:
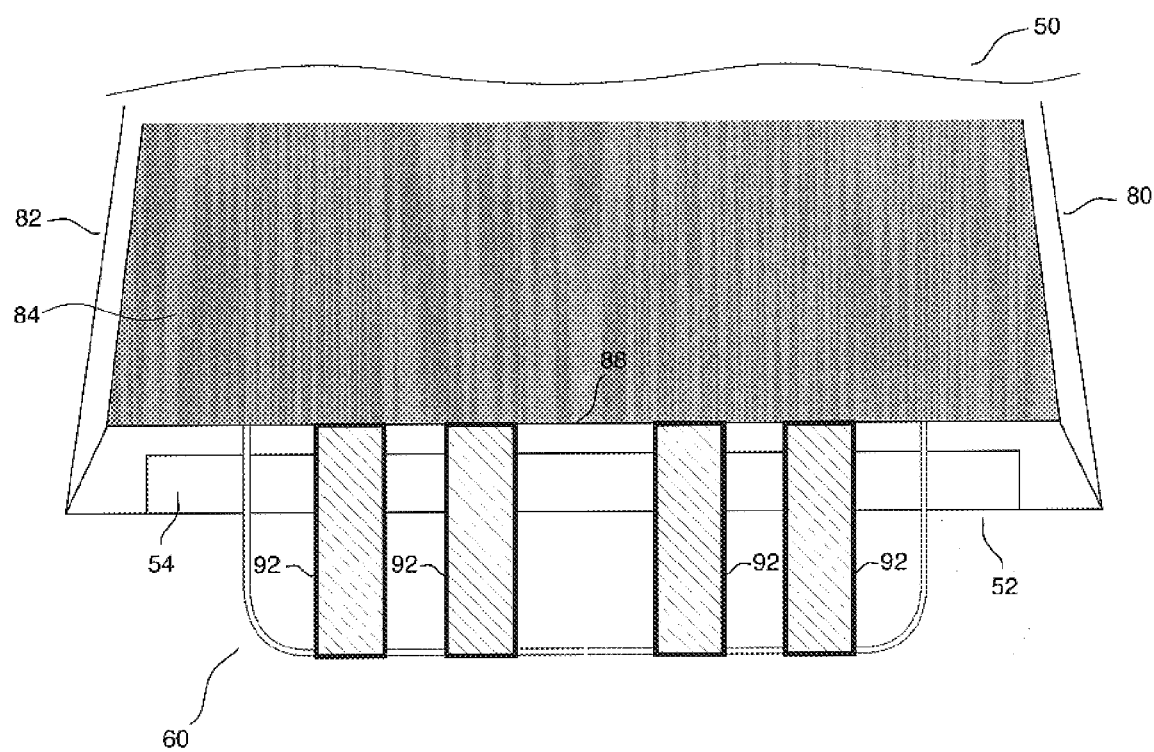

Reference now being made to FIG. 3, in accordance with the present invention, one or more parts of conventional stern gate support structure 60 have first been removed, and inventive stern flap means 100 has subsequently been integrated with the remaining stern gate support structure, viz., inventive stern gate support means 90, resulting in the present invention's integral hydrodynamic/supportive structure 190. Stern flap means 100 is characterized by an upper, "nonhydrodynamic" flap surface 101, a lower, "hydrodynamic" flap surface 103, a chord length c and a thickness t. The present invention's stern flap means 100 is disposed at a shallower flap angle α (an angle formed by lower flap surface 103 and hull bottom 84) in comparison with the flap angle α of standard stern flap 50 shown in FIG. 2. As shown in FIG. 3, the present invention integrates the stern flap hydrodynamic surface through the gate support brackets. In contrast, the concept illustrated in FIG. 2 provides for installation of a stern flap hydrodynamic surface under the brackets. The present invention's design depicted in FIG. 3 allows for the hydrodynamic surface to be installed at the shallower angles necessary for the desired performance enhancement.

With reference to FIG. 4 through FIG. 9, ship 50 is characterized by centerline m and includes port side 80, starboard side 82, hull bottom 84, flat stern 56, stern gate 54, and knuckle 88. Knuckle 88 is the lower transverse stern edge, i.e., the junction of hull bottom 84 and stern 56. Appended at stern 56 is conventional stern gate support structure 60, which includes stern gate support brackets 92 and other, reinforcing structure such as protection pipe 94 and bracing supports 96 (shown in FIG. 4, FIG. 5, FIG. 8 and FIG. 9). Conventional stern gate support structure 60 is characterized by symmetry about the geometric vertical bisector plane passing through centerline m. As illustrated in FIG. 7 through FIG. 9, the upper bracket surfaces 93 of support brackets 92 are at least substantially characterized by flatness and evenness so as to together approximately define a geometric upper support plane $p_S$ for supporting stern gate 54 in the fully open position.

As a general rule, according to conventional stern gate support practice, the more brackets 92 included in the conventional stern gate support structure 60, the fewer bracing supports 96 are needed. Hence, conventional stern gate support structure 60 shown in FIG. 4 and FIG. 7 has two brackets 92 and two bracing supports 96; conventional stern gate support structure 60 shown in FIG. 5 and FIG. 8 has three brackets 92 and one bracing support 96; conventional stern gate support structure 60 shown in FIG. 4 and FIG. 7 has four brackets 92 and no bracing supports 96.

Figure 10:
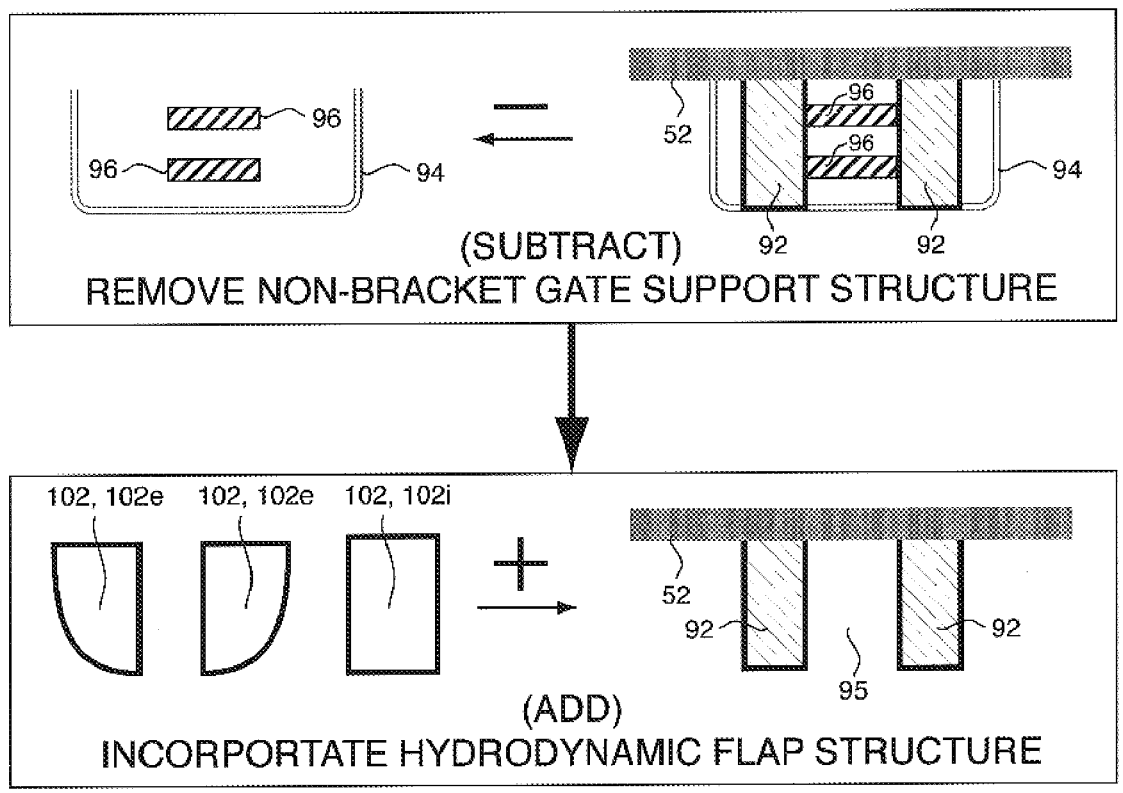
FIG. 10 is a block diagram illustrative of typical practice of the present invention, according to which one or more "superfluous" structural parts are removed from the stern gate support structure, principally leaving the "brackets" (bracket-like supportive structural parts), and one or more hydrodynamic flap structural parts are attached to the remaining "brackets" (bracket-like supportive structural parts), thereby forming an integral flap/support structure (i.e., an integral structure which is both hydrodynamic in the manner of a stern flap and supportive in the manner of a stern gate support structure) such as shown in FIG. 11 through FIG. 17.

Now referring to FIG. 10, many embodiments of the present invention involve retrofitting flap structure onto some existing support structure. In order to convert conventional stern gate support structure 60 to an inventive dual-purpose structure which acts as both (i) a hydrodynamic stern flap and (ii) a stern gate support, one or more secondary members are removed from conventional stern gate support structure 60, leaving the primary members which actually effect the supporting of stern gate 54. That is, one or more reinforcement parts such as protection pipe 94 and bracing supports 96 are removed from conventional stern gate support structure 60, leaving inventive stern gate support means 90 comprising two or more separated support brackets 92 describing empty spaces 95. Every adjacent pair of support brackets 92 has a space 95 therebetween. According to typical inventive practice, what essentially remains upon removal of the secondary structure are the original plural brackets 92. The stern gate support structure thus essentially being the bare support brackets 92, the inventive practitioner then combines one or more stern flap sections 102 with the still present support brackets 92, thus forming an integral dual-purpose structure, viz., a stern-flap/stern-gate-support structure 190 such as shown in FIG. 11 through FIG. 20.

It can be considered that there are at least two basic categories of stern flap sections 102 in accordance with the present invention, styled herein "intervening" stern flap sections 102$i$ and "end" stern flap sections 102$e$. Intervening stern flap sections 102$i$ are each placed in a space 95 between two adjacently separated brackets 92 so as to be attached to both brackets 92 as well as to stern 52. In addition, according to some inventive embodiments, two end ("wing") stern flap sections 102$e$ are each placed next to an end bracket 92 so as to be attached to the end bracket 92 as well as to stern 52. Regardless of its placement, every stern flap section 102 is attached to one or two brackets 92 as well as to stern 52, and must "fit"—that is, must be sufficiently conformal to the contiguous surfaces of the bracket(s) 92 and stern 52 surfaces to which it is attached (e.g., welded).

According to typical inventive embodiments that are exclusive of end flap sections 102$e$, the total number of flap sections 102 (which is the total number of intervening stern flap sections 102$i$) is one less than the total number of brackets 92. According to typical inventive embodiments that are inclusive of end flap sections 102$e$, the total number of flap sections 102 (which is the total number of intervening stern flap sections 102$i$ plus two end flap sections 102$e$) is one more than the total number of brackets 92.

Still with reference to FIG. 10, and also with reference to FIG. 11 through FIG. 17, the present invention's integratively hydrodynamic/supportive structure 190 comprises stern flap means 100 and stern gate support means 90. Stern flap means 100 includes one or more stern flap sections 102. According to typical inventive practice, each stern flap section 102 is made so as to include external metal plating and internal metal bracing beams. Stern gate support means 90 includes two or more stern gate support brackets 92 which are spaced apart from each other so as to leave voids. According to typical inventive practice, each stern gate support bracket 92 is made so as to include a heavy metal composition capable of supporting the weight (e.g., vertical force) of stern gate 54. Generally, the support brackets 92 constitute the "weight-bearing" components of the inventive hydrodynamic/support structure 190. The stern flap section or sections 102 are also "structural" in the sense of being "load-bearing" so as to bolster the overall construction of inventive hydrodynamic/supportive structure 190, but generally will not be "weight-bearing" in the sense of contributing significantly to the supporting of the weight of stern gate 54.

Every space 94 between two adjacently separated brackets 92 is occupied by a different intervening flap section 102$i$. Some inventive embodiments of hydrodynamic/supportive structure 190 include at least one intervening flap section 102$i$, but do not include any end flap section 102$e$. Other inventive embodiments of hydrodynamic/supportive structure 190 include at least one intervening flap section 102$i$ and also include two end flap sections 102$e$. Regardless of the presence or absence of end flap sections 102$e$, the present invention will typically be characterized by Conventional stern gate support structure 60 is characterized by symmetry about the geometric vertical bisector plane passing through centerline m.

Figure 11:
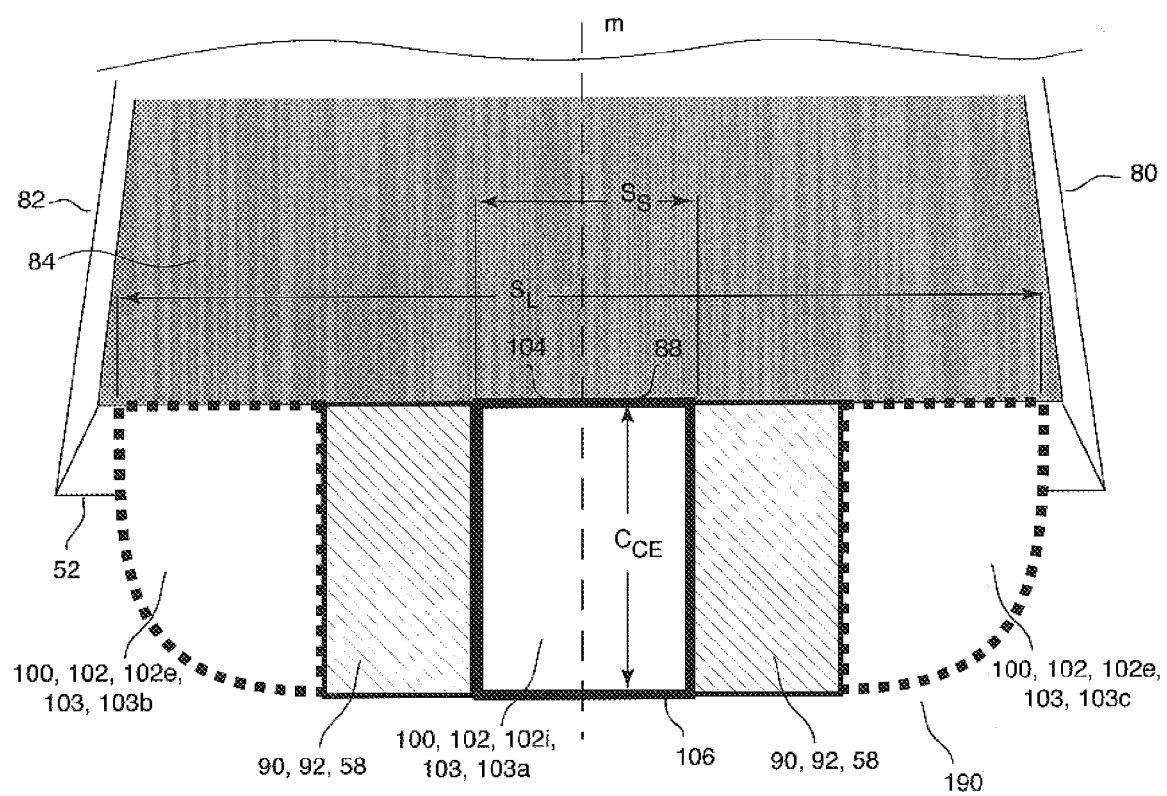
FIG. 11, is a diagrammatic bottom plan view, similar to the views shown in FIG. 4 through FIG. 6, particularly illustrating inventive embodiments of an integral flap/support structure which includes two support brackets.
Figure 16:
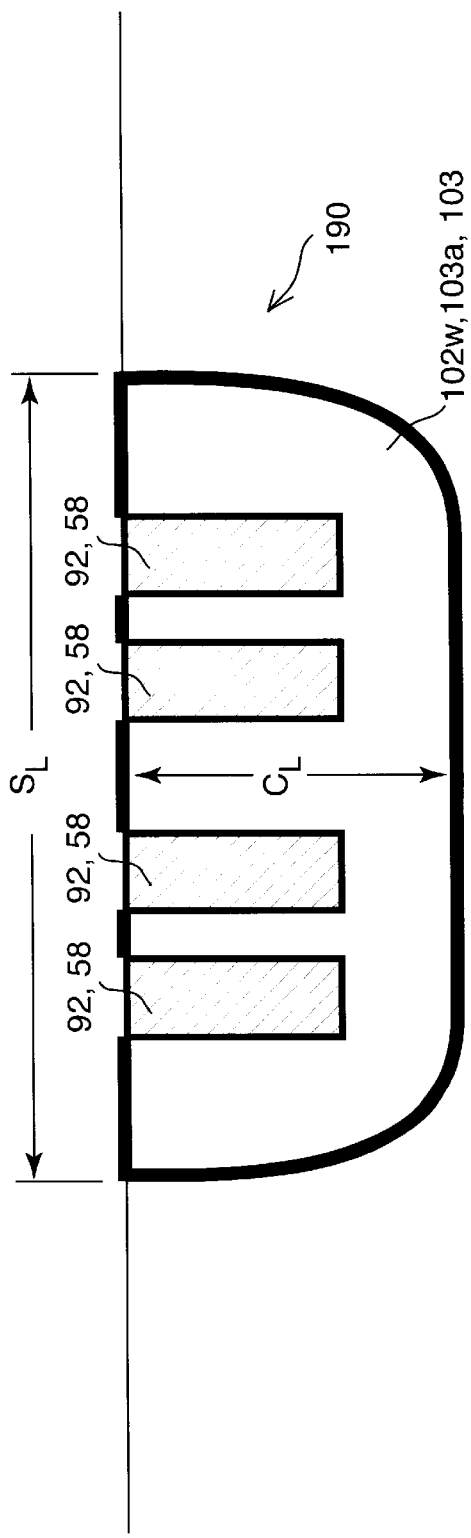
Figure 17:
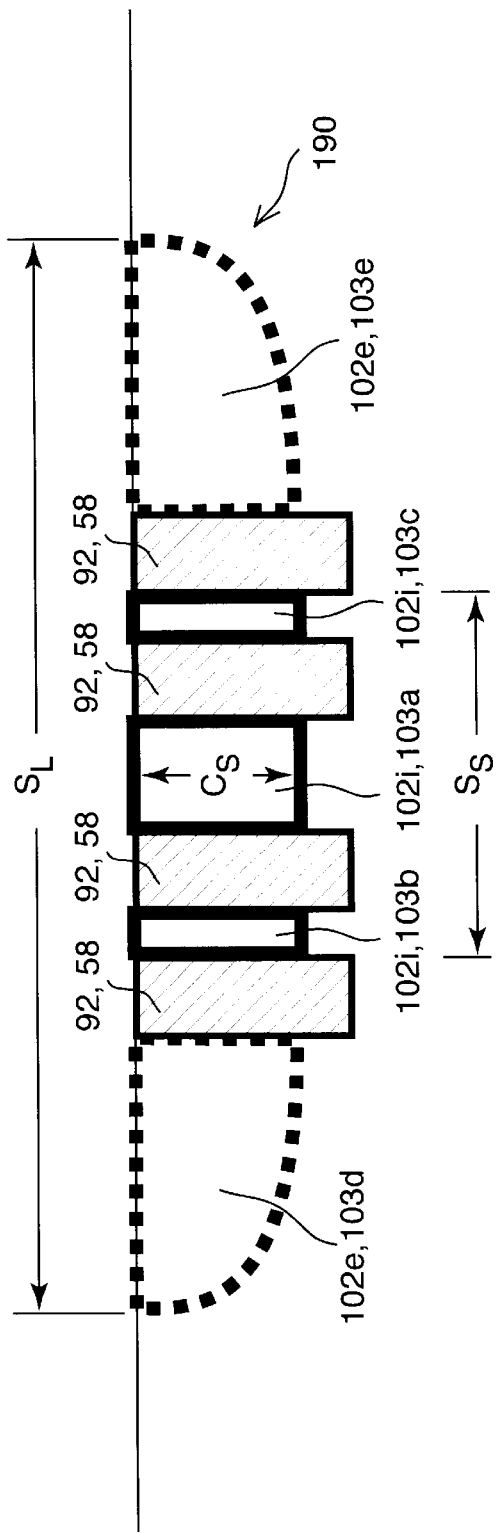
Figure 21:
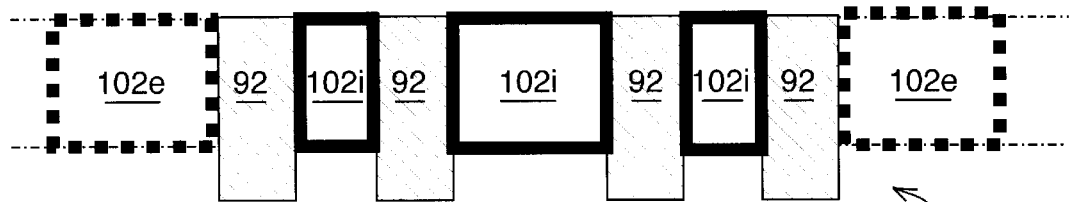
Figure 22:
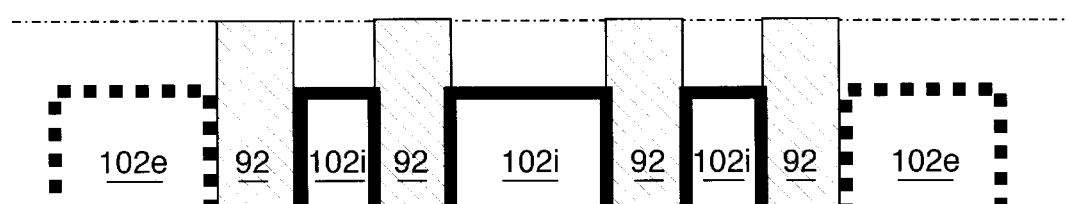
Figure 23:
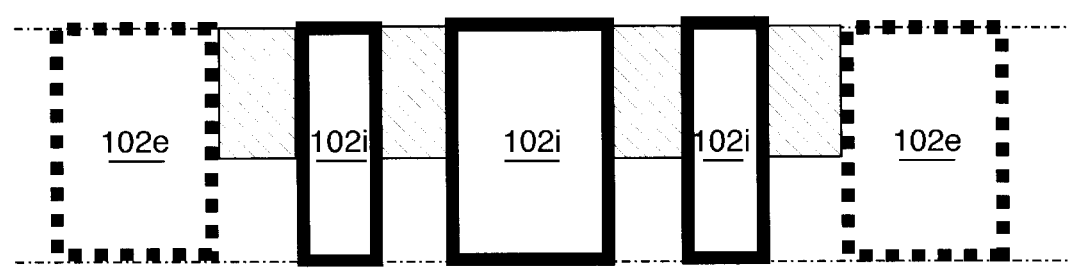
Figure 24:
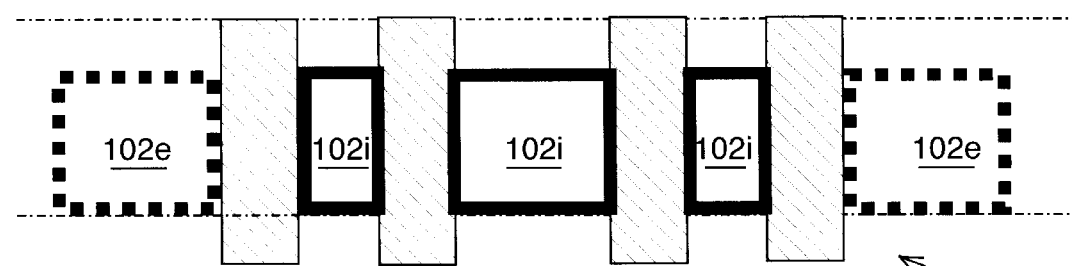

FIG. 11 through FIG. 17 illustrate a few among numerous configurational possibilities of inventive practice in terms of various chord lengths c and/or span lengths s. The chord length of a stern flap is the perpendicular distance, along the stern flap's lower surface, between the stern flap's leading edge and the stern flap's trailing edge. In the context of the present invention, the chord length c of inventive structure 190 is the chord length, measured between leading edge 104 and trailing edge 106, which is generally described by the aggregate intervening stern flap sections 102$i$, each stern flap section 102$i$ being characterized by the same chord length c. As shown in FIG. 12 through FIG. 17, each of plural intervening flap sections 102$i$ within each figure has the same chord length c. A chord length can be coextensive with, less extensive than or more extensive than support brackets 92. As shown in FIG. 11, the single intervening flap section 102$i$ has a "coextensive" or "coequal" chord length $c_{CE}$, measured between leading edge 104 and trailing edge 106, which is approximately coextensive with support brackets 92. The inventive structure 190 shown in FIG. 17 is characterized by a "short" chord length $c_S$, which does not extend as far aft as do the support brackets 92.

The inventive structure 190 shown in FIG. 16 is characterized by a "long" chord length $c_L$, which extends further aft than do the support brackets 92. Inventive structure 190 embodiments characterized by "long" chord length $c_L$ lend themselves to being made by combining a single stern flap means 100 piece, such as "wholistic" stern flap section 102$_W$ shown in FIG. 16, with the existing support brackets 92. These one-piece stern flap embodiments can be characterized by a "long" span length $s_L$ or by a "short" span length $s_S$. A wholistic stern flap section 102$_W$ for an inventive structure 190 having a "long" span length $s_L$ has indicia of both an intervening stern flap section 102, and an end stern flap section 102$_E$.

The span length of a stern flap is the perpendicular distance, along the stern flap's lower surface, between the stern flap's two extreme tips or ends. In the context of the present invention, the span length s of inventive structure 190 runs between the two extreme locations of the aggregate stern flap sections 102. FIG. 11 and FIG. 17 each show two different inventive configurations, depending upon whether or not the end flap sections 102$e$ (shown in dotted form) are included therein. A "long" span length $s_L$ is the span length of the configuration inclusive of the two end flap sections 102$e$ —in other words, a span length extending beyond the two extreme (outermost) stern gate support brackets 92. A "short" span length $s_S$ is the configuration exclusive of end flap sections 102$e$ —in other words, a span length contained within the two extreme (outermost) stern gate support brackets 92.

As shown in FIG. 11, short span length $s_S$ runs along the stern flap section 102$i$ bottom surface 103$a$ between the extreme edges of stern flap section 102$i$. Inventive structure 190 configurations characterized by a short span lengths $s_S$ are also shown in FIG. 12 and FIG. 14. In FIG. 12 and FIG. 14, short span length $s_S$ is measured along the aggregate stern flap section bottom surfaces 103 between the extreme (outermost) edges of the extreme (outermost) stern flap sections 102$i$. Inventive structure 190 configurations characterized by a long span lengths $s_L$ are also shown in FIG. 13, FIG. 15 and FIG. 16.

Reference now being made to FIG. 18 through FIG. 28, there are multifarious inventive structure 190 configurations in terms of thickness and placement of flap sections 102. As shown in FIG. 18 through FIG. 28, every intervening flap section 102$i$ is interposed between two brackets 92; however, the vertical thickness of the flap section 102$i$ and it's vertical disposition relative to the two adjacent brackets 92 can vary according to the inventive embodiment of structure 190. Bearing in mind that FIG. 18 through FIG. 28 are "edge-on" elevation views, it is to be understood that there is a variety of inventive structure 190 configurations even within a single figure among FIG. 18 through FIG. 28.

Figure 29:
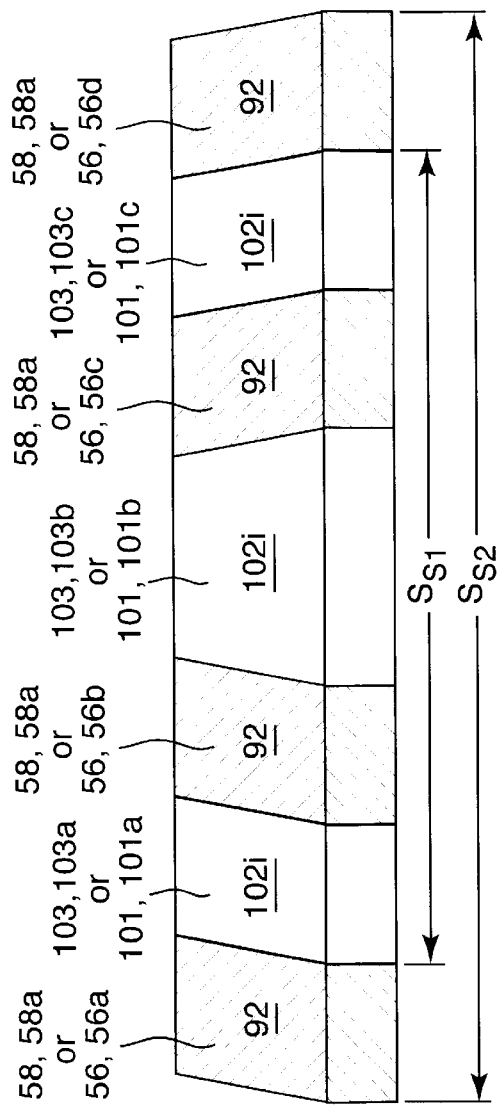
FIG. 29 and FIG. 30 are rear perspective (conceivably, either upper or lower) views of two inventive "smooth" flap/support structure embodiments.
Figure 30:
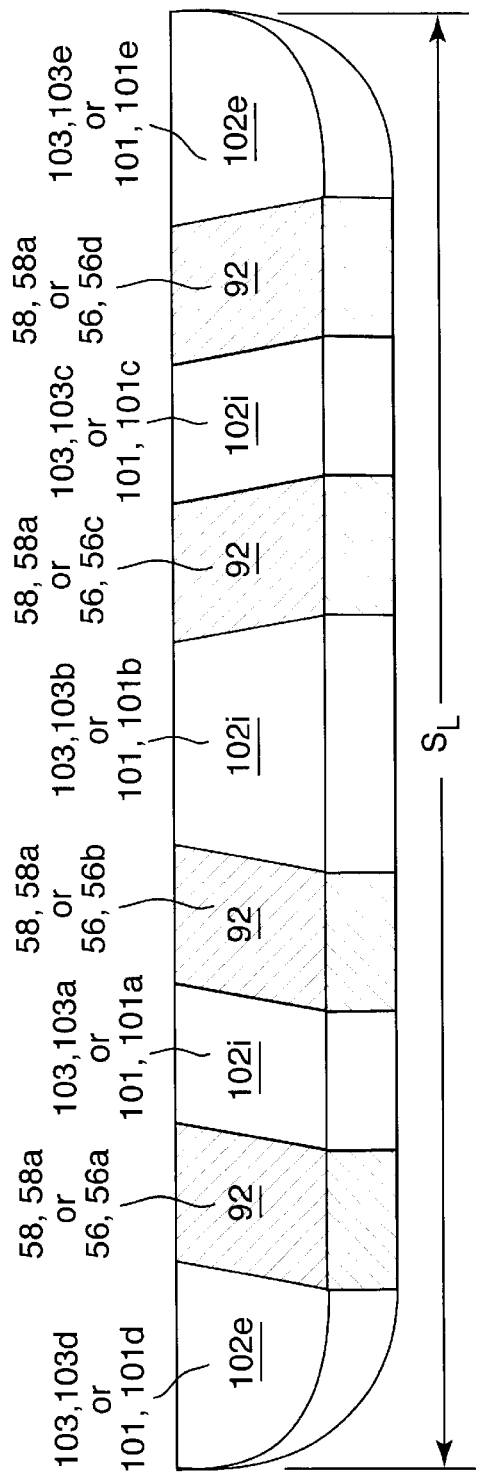

Reference is again made to FIG. 10 through FIG. 17 and is additionally made to FIG. 29 and FIG. 30. The collective upper (supportive) stern gate support surface 56 is described by the aggregate respective upper bracket support surfaces 56$a$, 56$b$, etc., of the plural brackets 92, wherein upper bracket surfaces 56$a$, 56$b$, etc. are each at least substantially planar and are together at least substantially coplanar. The collective lower (non-supportive) stern gate support surface 58 is described by the aggregate respective lower bracket support surfaces 58$a$, 58$b$, etc., of the plural brackets 92. The collective upper ("non-hydrodynamic") surface 101 of stern flap means 100 is described by the upper, "non-hydrodynamic" flap section surface 101$a$ (if there is one flap section 92) or by the aggregate respective upper, "nonhydrodynamic" flap section surfaces 101$a$, 101$b$, etc. (if there is more than one flap section 92). The collective lower ("hydrodynamic") surface 103 of stern flap means 100 is described by the lower, "hydrodynamic" flap section surface 103$a$ (if there is one flap section 92) or by the aggregate respective lower, "hydrodynamic" flap section surfaces 103$a$, 103$b$, etc. (if there is more than one flap section 92).

The present invention can be practiced so that stern flap structure is "retrofitted" upon existing stern gate support structure (for example as described in FIG. 10), or so that the entire hydrodynamic-supportive structure is manufactured from scratch. Shown in FIG. 29 and FIG. 30 are inventive embodiments (exclusive and inclusive, respectively, of stern flap end sections 102$e$) that are especially suitable for fabrication in their entirety "from scratch," as distinguished from an inventive incorporative ("retrofitting") approach such as described herein with reference to FIG. 10. What the inventive embodiments shown in FIG. 29 and FIG. 30 have in common is their "cleanness" or "purity" of form—i.e., essentially "total smoothness."

FIG. 29 shows inventive structure 190 with end flap sections 102$e$ absent. FIG. 30 shows inventive structure 190 with end flap sections 102$e$ present. A totally smooth inventive structure 190 which is completely fabricated from scratch will more usually be inclusive of end flap sections 102$e$ such as shown in FIG. 30, since there will likely be a less compelling structural reason (vis-á-vis inventive embodiments of an incorporative nature) to exclude end flap sections 102$e$ and thus pay a hydrodynamic penalty.

As shown in FIG. 29 and FIG. 30, the contours of the stern gate support means 90 (especially, brackets 92) and the contours of the stern flap means 100 (especially, stern flap sections 102) blend into a smoothly integral structure without breaks or discontinuities. In other words, the overall upper support surface 56 and the overall upper flap surface 101 blend into one another, thereby forming a continuous upper lower structure 190 surface, and the overall lower support surface 56 and the overall lower flap surface 101 blend into one another, thereby forming a continuous lower structure 190 surface.

The geometric shape of the inventive structure 190 shown in FIG. 29 and FIG. 30 is akin to that of a standard stern flap 70; however, inventive structure 190 shown in FIG. 29 and FIG. 30 is markedly different from a standard stern flap 70 in terms of both structure and function. The inventive structure 190 includes, in alternation, (a) two or more support bracket 92 sections (weight-bearing sections, preferably having a heavier weight-bearing composition including steel or other strong metal) and (b) one or more flap sections 102 (load-bearing but not weight-bearing sections, preferably having a lighter composition including upper and lower metal plates, and metal bracing beams therebetween).

The benefits of totally smooth embodiments such as those shown in FIG. 29 and FIG. 30 are especially manifest in terms of the lower surface. In effect, the entire lower structure 190 surface becomes the lower (hydrodynamic) lap surface 101. In other words, brackets 92, in effect, function also as flap sections 102. Thus, as shown in FIG. 29, the effective span length is span length $s_{S2}$ rather than span length $s_{S1}$. Though considerably less important than the smoothness of the entire lower structure 190 surface, the smoothness of the entire upper structure 190 surface will also generally carry a degree of hydrodynamic benefit.

Figure 31:
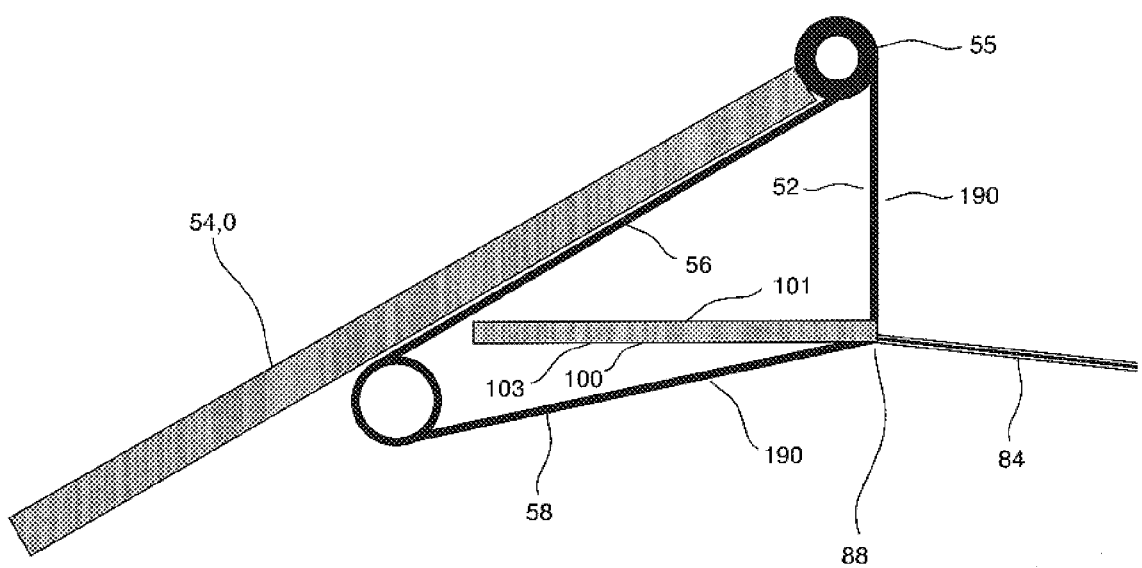
FIG. 31 is a partial and enlarged view of the inventive flap/support structure embodiment shown in FIG. 3.

Referring to FIG. 31, the present invention provides for two critical configurational requirements. Firstly, the stern flap means 100 must not interfere with the weight-bearing support of stern gate 54 by the stern gate support means 90. No portion of any structure of stern flap means 100 is permitted to extend beyond the planar (or substantially planar) geometric plane defined by the overall upper stern gate support surface 56 of stern gate support means 90. Thus, the stern flap means 100 must not hinder or prevent the abutment of lower stern gate surface 53 with overall upper stern gate support surface 56 when stern gate 54 is in open position o.

The second crucial inventive requirement is that the collective lower, "hydrodynamic" surface 103 of stern flap means 100 be at least substantially even with the hull bottom 84, thereby effectively extending the hull bottom surface by creating a surface continuum between hull bottom 84 and stern flap means 100. Consistent with stern flap technology in general, the present invention's lower flap surface 103 will complement the hull bottom 84 surface so as to effectively represent a continuation thereof. Accordingly, in accommodation with the at least substantially linear configuration of transom knuckle 88 and the at least substantially flat configuration of hull bottom surface 84, lower flap surface 103 will frequently be at least substantially planar (flat).

However, lower flap surface 103 may be characterized by a degree of vertical curvature, at least somewhat depending upon the straightness or curvature described by transom knuckle 88 within the (nearly) vertical flat geometric plane described by transom (stern) 52. There may be design complexities involved in inventive practice, for instance wherein the transom knuckle 88 describes a "W" or other relatively complex shape. Nevertheless, generally according to inventive practice, the collective lower, "hydrodynamic" surface 103 of stern flap means 100 will be at least substantially even with the hull bottom 84, thereby effectively extending the hull bottom surface by forming a continuous hull bottom surface including hull bottom surface 84 and lower stern flap surface 103.

With reference to FIG. 32 through FIG. 39, the present invention was evaluated by the present inventor, a civilian employee of the U.S. Navy, using a test model of a WASP Class ship (See FIG. 34 through FIG. 39) and test model of a HARPER'S FERRY Class ship. At model-scale, the original stern gate support structure and the present invention's various integral hydrodynamic/support stern structures were manufactured out of polyurethane on a Stereo Lithography Apparatus (SLA). Note that the ship model shown in FIG. 34 through FIG. 39 lacks a stern gate; since this was a test model, it was not necessary to replicate an actual stern gate. The test model thus includes a solid stern (rather than a stern gate) along with representative stern gate bracketing structure.

Experimental investigation of the present invention was initially performed by the U.S. Navy in August 2001 on a 1:31.069 scale model of the WASP (LHD 1) Class. These model-scale experiments demonstrated that the performance of the present invention's integral hydrodynamic/support stern structure designs exceeded that of the previously conceived flap designs on this hullform. Full-scale projections from these model-scale results indicate that the present invention's integral hydrodynamic-flap/gate-support stern structure 190 will reduce the annual propulsion fuel consumption by as much as 5.02%.

Figure 35:
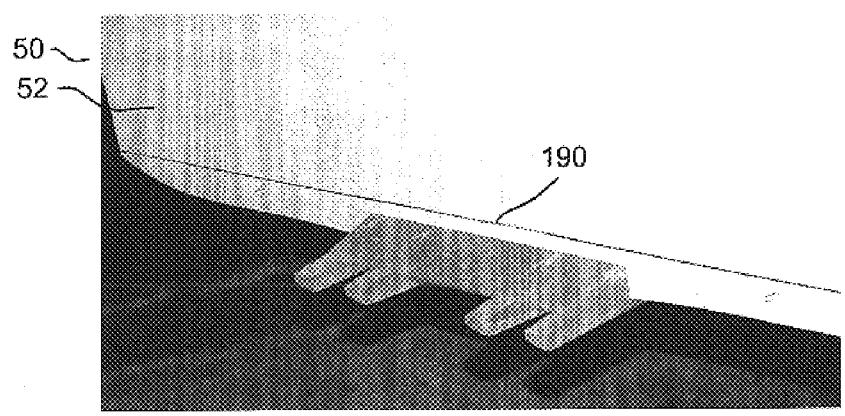
FIG. 35 is a photographic representation, in an upper back perspective view, of an inventive embodiment of an integral flap/support structure (similar to that shown in FIG. 14), shown installed with respect to the ship model shown in FIG. 34, such inventive embodiment having a span which is delimited by the distance between the lateral extremes of the existing stern gate support bracketing structure, and having a chord length which is equal to the chord length of the existing stern gate support bracketing structure.
Figure 36:
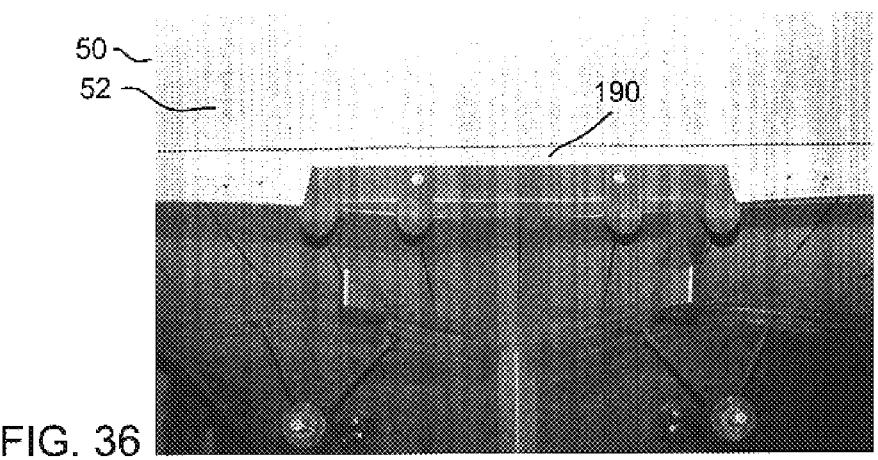
FIG. 36 is a photographic representation, in a lower back perspective view, illustrating the inventive installation shown in FIG. 35.
Figure 37:
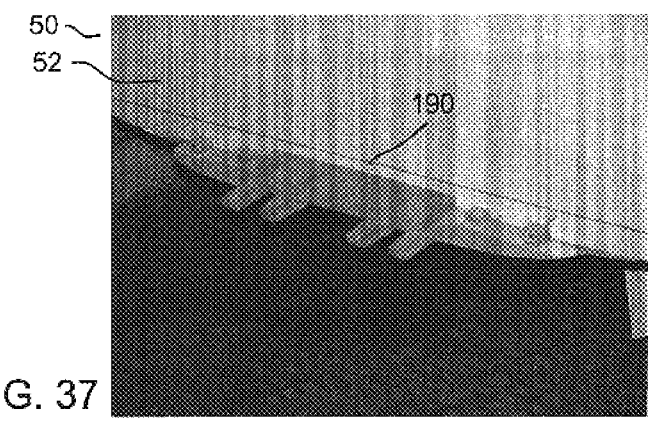
FIG. 37 is a photographic representation, in an upper back perspective view, of an inventive embodiment of an integral flap/support structure (similar to that shown in FIG. 17), shown installed with respect to the ship model shown in FIG. 34, such inventive embodiment having a span which exceeds the distance between the lateral extremes of the existing stern gate support bracketing structure, and having a chord length which is less than the chord length of the existing stern gate support bracketing structure.

Reduction of the present invention's flap span length to a short span length $s_S$ (to remain within the main stern gate support brackets 92), such as shown in FIG. 35 (and, equivalently, FIG. 40) and FIG. 36 (and, equivalently, FIG. 41), did not significantly affect overall performance, with a projected reduction in annual fuel consumption of 4.96%. A second model-scale investigation of the present invention was performed in March 2002 on a 1:21.251 scale model of the HARPER'S FERRY (LSD 41) and WHIDBEY ISLAND (LSD 49) Classes. Full-scale projected performance of the present invention's integral hydrodynamic-flap/gate-support stern structure 190 indicates that the annual fuel consumption will be reduced 5.6% on these Classes.

Figure 40:
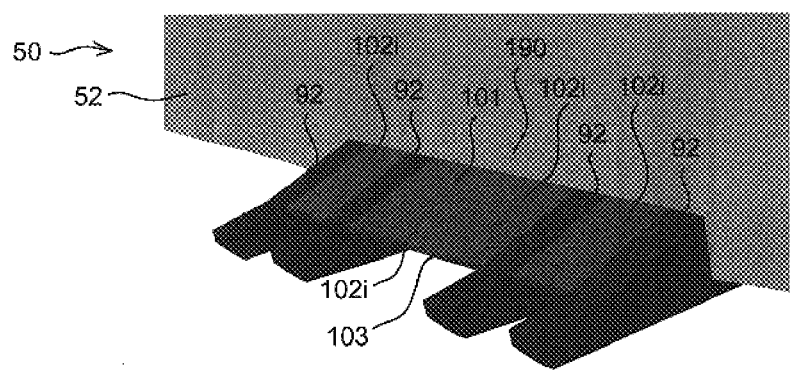
FIG. 40, FIG. 41, FIG. 42, FIG. 43, FIG. 44, FIG. 45, FIG. 46, FIG. 47, FIG. 48 and FIG. 49 are perspective-view renderings of various inventive embodiments of integral flap/support structures that are based on the conventional stern gate support structure shown in FIG. 34. The integral flap/support structure shown computer-generatively in FIG. 40 (upper perspective view) and FIG. 41 (lower perspective view) corresponds to that shown photographically in FIG. 35. The integral flap/support structure shown computer-generatively in FIG. 44 (upper perspective view) and FIG. 45 (lower perspective view) corresponds to that shown photographically in FIG. 37.
Figure 41:
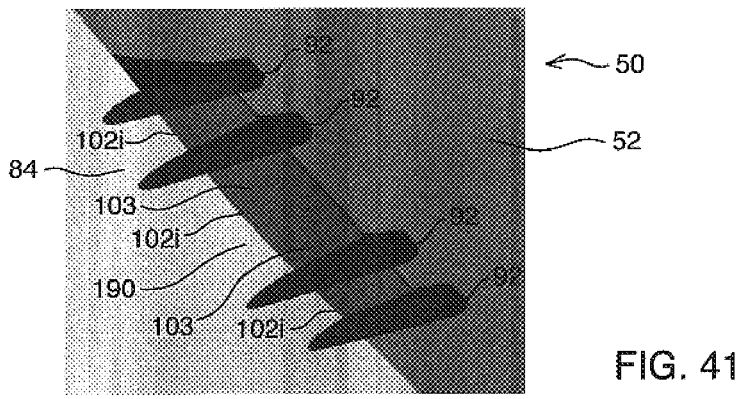
Figure 42:
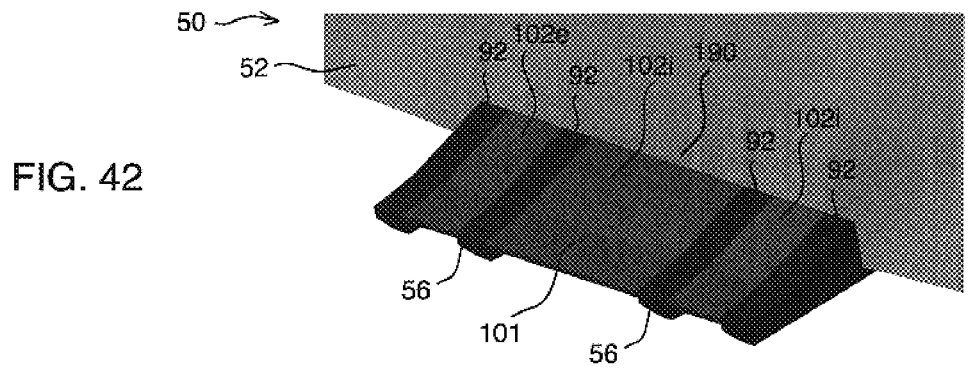
Figure 43:
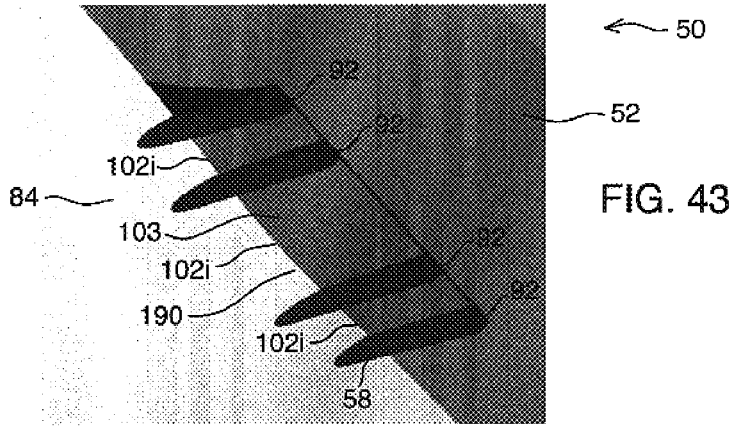
Figure 44:
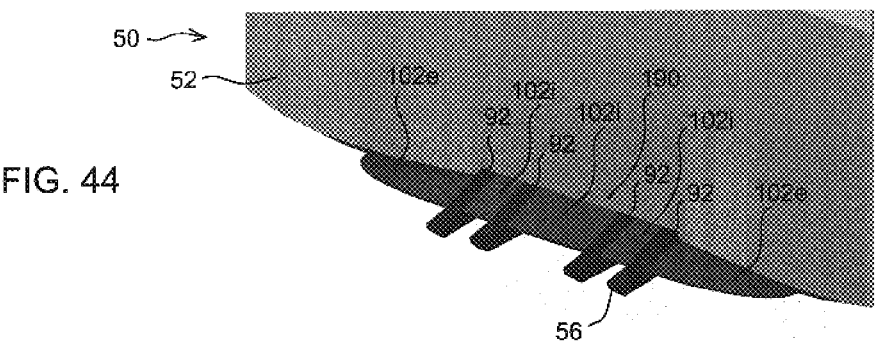
Figure 45:
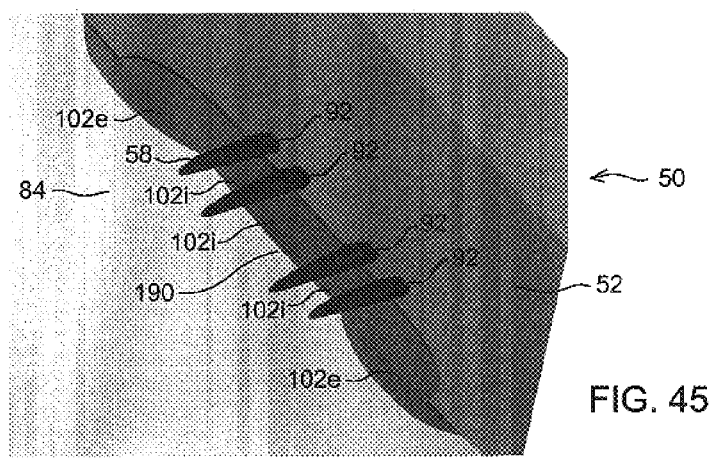

Now referring to FIG. 39 through FIG. 49, the inventor effected various CAD designs to facilitate testing of his invention. FIG. 40 and FIG. 41 show an inventive stern structure 190 wherein the span s of the stern flap means 100 is delimited by the lateral extremes of the stern gate means 90, and wherein the chord length $c_S$ described by the stern flap means 100 is shorter than the "chord length" described by the stern gate means 90. FIG. 42 and FIG. 43 show an inventive stern structure 190 wherein the span $s_S$ of the stern flap means 100 is delimited by the lateral extremes of the stern gate means 90, and wherein the chord length $c_{CE}$ described by the stern flap means 100 equals the "chord length" described by the stern gate means 90. FIG. 44 and FIG. 45 show an inventive stern structure 190 wherein the span $s_L$ of the stern flap means 100 is not delimited by the lateral extremes of the stern gate means 90, and wherein the chord length $c_S$ described by the stern flap means 100 is shorter than the "chord length" described by the stern gate means 90. FIG. 46 and FIG. 47 show an inventive stern structure 190 wherein the span $s_L$ of the stern flap means 100 is not delimited by the lateral extremes of the stern gate means 90, and wherein the chord length $c_{CE}$ described by the stern flap means 100 equals the "chord length" described by the stern gate means 90. FIG. 48 and FIG. 49 are two views of the same inventive stern structure 190; as distinguished from the inventive stern structures 190 shown in FIG. 40 through FIG. 47 (which include four brackets 92), the inventive stern structure 190 shown in FIG. 48 and FIG. 49 includes two brackets 92.

Particularly well shown in FIG. 41, FIG. 43, FIG. 45 and FIG. 47 are the protrusions of the main strut brackets 92 below the lower surfaces 103a, 103b, 103c and 103d of the corresponding stern flap sections 102. This happenstance, characteristic of some inventive embodiments (particularly those involving adaptation to existing stern gate support structure), is disadvantageous in that some portions of brackets 92 will penetrate through the overall lower, stern flap "hydrodynamic" surface 103 of stern flap means 100. Potentially, the penetration in this manner of the brackets 92 through the stern flap hydrodynamic surface 103 will somewhat degrade the hydrodynamic performance potential of the present invention's integral hydrodynamic/supportive structure 190, especially if the TED flap angle a of the stern flap means 100 hydrodynamic surface 103 is shallow.

As compared with inventive embodiments of this "penetrative" nature, an "underneath" stern flap installation approach such as illustrated in FIG. 2 would be advantageous insofar as the stern gate support structure would be "masked." While the masking of the stern gate support structure is not maximized according to some inventive embodiments, the hydrodynamic mechanisms of stern flap performance are better utilized in accordance with the present invention. The net result of inventive practice is a stern flap design with acceptable performance and greater potential for propulsion fuel reduction.

Depending on the application of the present invention, greater or lesser configurational design complexity may be necessitated in accordance with the configurational details of the ship hull 50. A case in point is the WASP Class LHD8, shown in FIG. 34, for which the inventor was tasked to install stern flap capability meeting certain performance criteria. As shown in FIG. 37, FIG. 38 and FIG. 44 through FIG. 47, the "tunnel stern" ("W"-shaped) design of the hull demanded a more complex geometry of a long-span inventive hydrodynamic/supportive stern structure 190 (i.e., an inventive structure 190 which includes two end stern flap sections 102*e*). In order to maintain an essentially single, constant angle a geometric plane for the overall hydrodynamic flap surface 103, the inventor found it necessary to partially "fill" the tunnels. This kind of design complexity associated with a given hull 50 would likely militate against full-scale manufacture "from scratch" of an inventive structure 190 for purposes of application to such hull 50.

Figure 25:
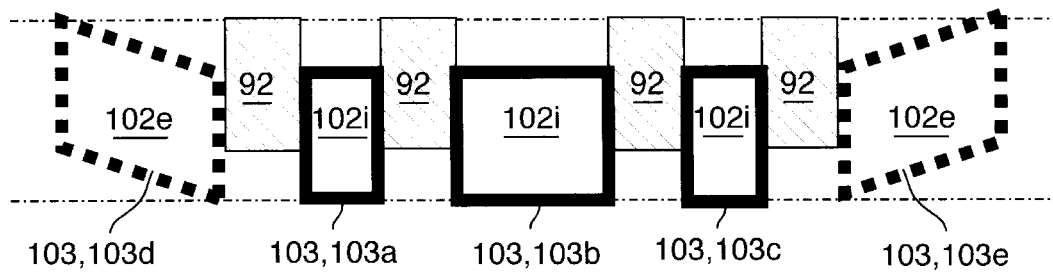
Figure 26:
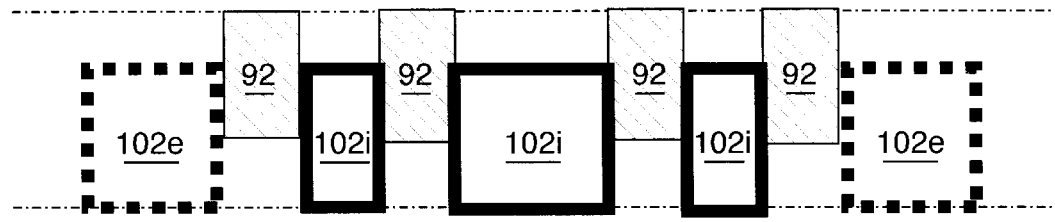
Figure 27:
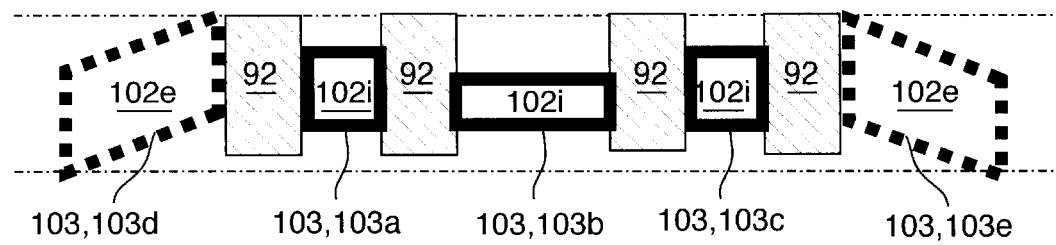
Figure 28:
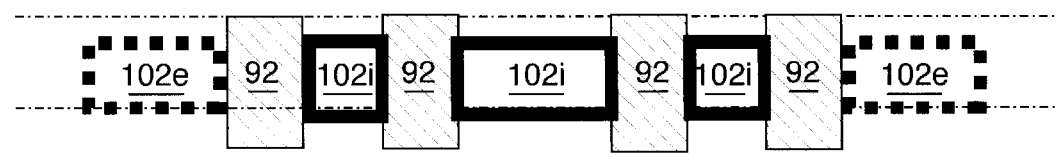

Some design complexities can be avoided by abandoning the requirement that the overall hydrodynamic flap surface 103 essentially define a single, flat, constant-angled geometric plane. Again with reference to FIG. 25 and FIG. 27, the present invention can be practiced whereby the inventive structure 190 defines a first, medial hydrodynamic plane inside the brackets 92 and a pair of second, outboard hydrodynamic planes outside the brackets 92. The two outboard hydrodynamic planes are at equal and opposite angles to each other, and are at modified angles relative to the first hydrodynamic plane. The angularities of the outboard planes can differ from the angularity of the medial plane in a longitudinal direction and/or a transverse direction with respect to the hull 50, the main characteristic being that the outboard planes are not coplanar with the medial plane. As shown in FIG. 25 and FIG. 27, the overall hydrodynamic surface 103 includes: (i) a medial planar hydrodynamic surface, including surfaces 103*a*, 103*b* and 103*c*, between the brackets 92; (ii) a port lateral planar hydrodynamic surface 103*d*, obliquely sloped relative to medial planar hydrodynamic surface 103*a*, outboard of the left-most bracket 92; and, (iii) a starboard lateral planar hydrodynamic surface 103*e*, obliquely sloped relative to medial planar hydrodynamic surface 103*a* and oppositely sloped relative to port lateral planar hydrodynamic surface 102*d*, outboard of the right-most bracket 92. In this way, the inventive practitioner can reduce the geometric complexities of the end flap surfaces outboard of the brackets.

In the light of the instant disclosure, the ordinarily skilled artisan will be capable of practicing the present invention in any of a variety of embodiments. Moreover, in the light of the instant disclosure the ordinarily skilled artisan will be capable of evaluating how to practice the present invention in a beneficial manner, in terms of performance, for a given application. Generally speaking, key parameters affecting the performance of a stern flap include chord length, span length, TED angle (angle relative to the buttock lines, e.g., buttock centerline), planform shape and thickness shape. Among the possible special considerations regarding shape are the configurational fairing details (e.g., at outboard locations in the vicinity of the transom knuckle).

Other embodiments of this invention will be apparent to those skilled in the art from a consideration of this specification or practice of the invention disclosed herein. Various omissions, modifications and changes to the principles described herein may be made by one skilled in the art without departing from the true scope and spirit of the invention which is indicated by the following claims.

What is claimed is:

1. Dual-purpose adjunctive apparatus for being appended to the stern of a marine hull having a stern gate, said apparatus comprising plural spaced bracket members and at least one stern flap member each interposedly joining two said bracket members, each said bracket member having a bracket member top surface, each said stern flap member having a stern flap member bottom surface, said apparatus being capable of being appended to said stern whereby said stern gate rests upon said at least two bracket member top surfaces and whereby said at least one stern flap member bottom surface interacts with the water navigated by said marine hull, said apparatus thereby being structurally supportive with respect to said stern gate and hydrodynamically influential with respect to said marine hull.

2. The apparatus defined in claim 1, wherein:

said marine hull has a bow and a hull bottom;

said at least one stern flap member generally describes a stern flap trailing edge; and said being hydrodynamically influential includes generally establishing a surface continuum extending from said bow to said stern flap trailing edge.

3. The apparatus defined in claim 1, wherein:

said marine hull has a port side and a starboard side; and said bracket members are spaced transverse said stern between said port side and said starboard side.

4. The apparatus defined in claim 1, wherein the number of said at least one stern flap member is one less than the number of said bracket members.

5. The apparatus defined in claim 4, wherein:

said marine hull has a port side and a starboard side; and said bracket members are spaced transverse said stern between said port side and said starboard side.

6. The apparatus defined in claim 5, wherein:

said apparatus has a port-most end and a starboard-most end;

a first said bracket member is located at said port-most end; and a second said bracket member is located at said starboard-most end.

7. The apparatus defined in claim 5, wherein:

said apparatus has a port-most end and a starboard-most end;

said at least one stern flap member is an intervening at least one stern flap member;

said apparatus further comprises two end stern flap members;

a first end stern flap member is located at said port-most end and joins a first said bracket member; and a second said stern flap member is located at said starboard-most end and joins a second said bracket member.

8. An auxilliary assembly for attachment at the stern of a ship, said stern including a stern gate pivotable about a horizontal axis between closed and open positions of said stern gate, said assembly being capable of said attachment at least substantially below said axis so as to be generally disposed projectingly aft of said stern, said assembly comprising at least three united components consisting of at least two support components and at least one hydrodynamic component, wherein during said attachment:

said at least two support components and said at least one hydrodynamic component are in alternating arrangement across said stern;

said at least two support components generally describe a unitary support surface for supporting said stern gate when said stern gate is in an open position; and said at least one hydrodynamic component generally describes a unitary hydrodynamic surface for hydrodynamically affecting said ship when said ship is navigating.

9. The assembly according to claim 8, wherein at least one said nonhydrodynamic component serves to bolster said assembly.

10. The assembly according to claim 8, wherein:

said at least two support components number n said support components;

said at least one hydrodynamic component numbers (n−1) said hydrodynamic components;

each said hydrodynamic component is situated between two said support components; and two said support components are situated at laterally opposite extremes of said assembly.

11. The assembly according to claim 8, wherein:

said at least two support components number n said support components;

said at least one hydrodynamic component numbers (n+1) said hydrodynamic components;

(n−1) said hydrodynamic components are each situated between two said support components; and two said hydrodynamic components are situated at laterally opposite extremes of said assembly.

12. The assembly according to claim 8, wherein each said support component has a supportive upper surface and a nonsupportive lower surface, and wherein each said supportive upper surface represents a portion of said unitary support surface.

13. The assembly according to claim 8, wherein each said hydrodynamic component has a nonhydrodynamic upper surface and a hydrodynamic lower surface, and wherein each said hydrodynamic lower surface represents a portion of said unitary hydrodynamic surface.

14. The assembly according to claim 13, wherein each said support component has a supportive upper surface and a nonsupportive lower surface, and wherein each said supportive upper surface represents a portion of said unitary support surface.

15. The assembly according to claim 14, wherein at least one said nonsupportive lower surface represents a portion of said unitary hydrodynamic surface.

16. A method of improving the hydrodynamic quality of a vessel including a stern provided with a stern gate, said stern having a stern gate support device annexed thereto, said stern gate support device including a plurality of separate approximately parallel support members each protruding approximately longitudinally relative to said vessel, said method comprising integrating at least one stern flap section with said support members, said integrating including connecting every pair of adjacent said support members via a different said stern flap section, said integrating thereby forming an integral unit annexed to said stem, said integral unit being characterized by supportive functionality associated with said support members and by hydrodynamic functionality associated with said at least one stern flap section.

17. The method of improving the hydrodynamic quality as recited in claim 16, wherein:

said integrating is of at least two said stern flap sections with said support members; and said hydrodynamic functionality involves the operation of said at least two said stern flap sections essentially as a single coherent stern flap.

18. The method of improving the hydrodynamic quality as recited in claim 16, wherein said connecting every said pair includes coupling said stern flap section with each said support member of said pair of said support members.

19. The method of improving the hydrodynamic quality as recited in claim 18, wherein:

said support members include an extreme left said support member and an extreme right said support member;

said integrating includes coupling an extreme left said stern flap section with, and to the left of, said extreme left said support member; and said integrating includes coupling an extreme right said stern flap section with, and to the right of, said extreme right said support member.

20. The method of improving the hydrodynamic quality as recited in claim 19, wherein:

each said support member is attached to said stern;

said stern gate support device further includes at least one reinforcement member, each said reinforcement member being attached to at least two said support members and being unattached to said stern; and said method further comprises removing said at least one reinforcement member prior to performing said integrating.

* * * * *